May 4, 1937.　　　　C. L. LEE　　　　2,079,355
AUTOMATIC OVERDRAFT DEVICE FOR CALCULATING MACHINES
Filed April 14, 1932　　14 Sheets-Sheet 1

Inventor
Charles L. Lee
By
*Carl Beust*
His Attorney

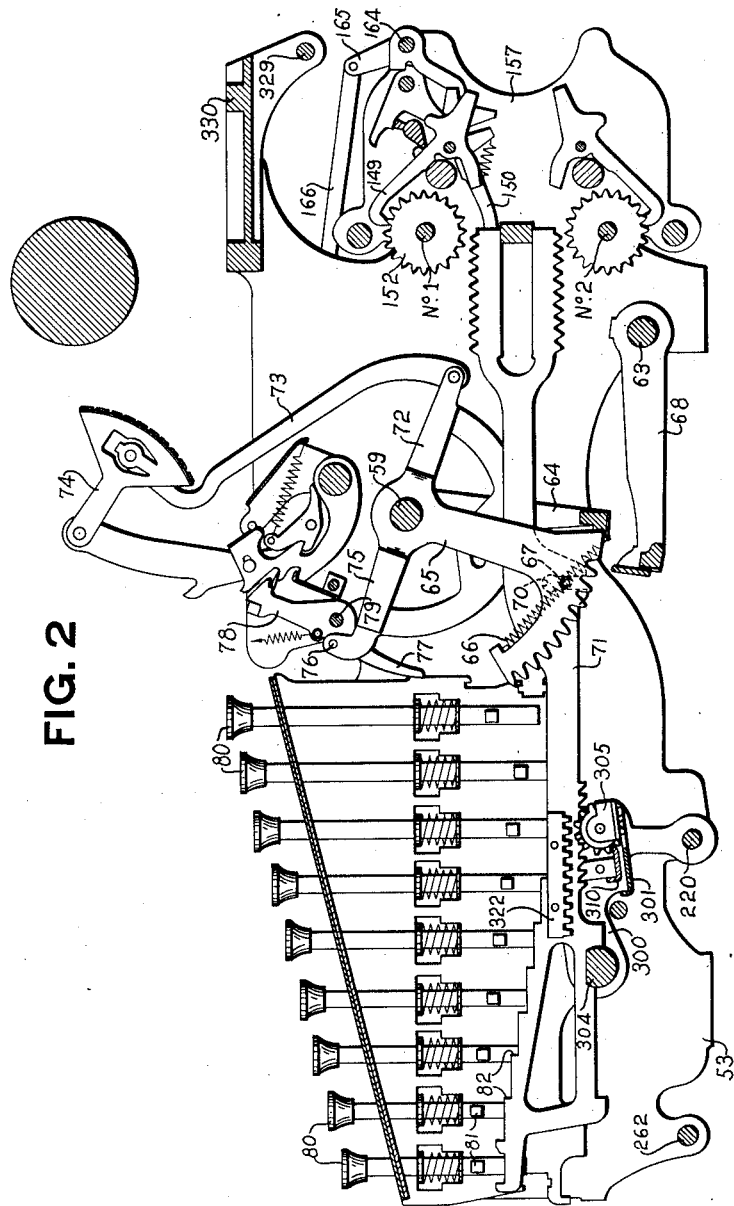

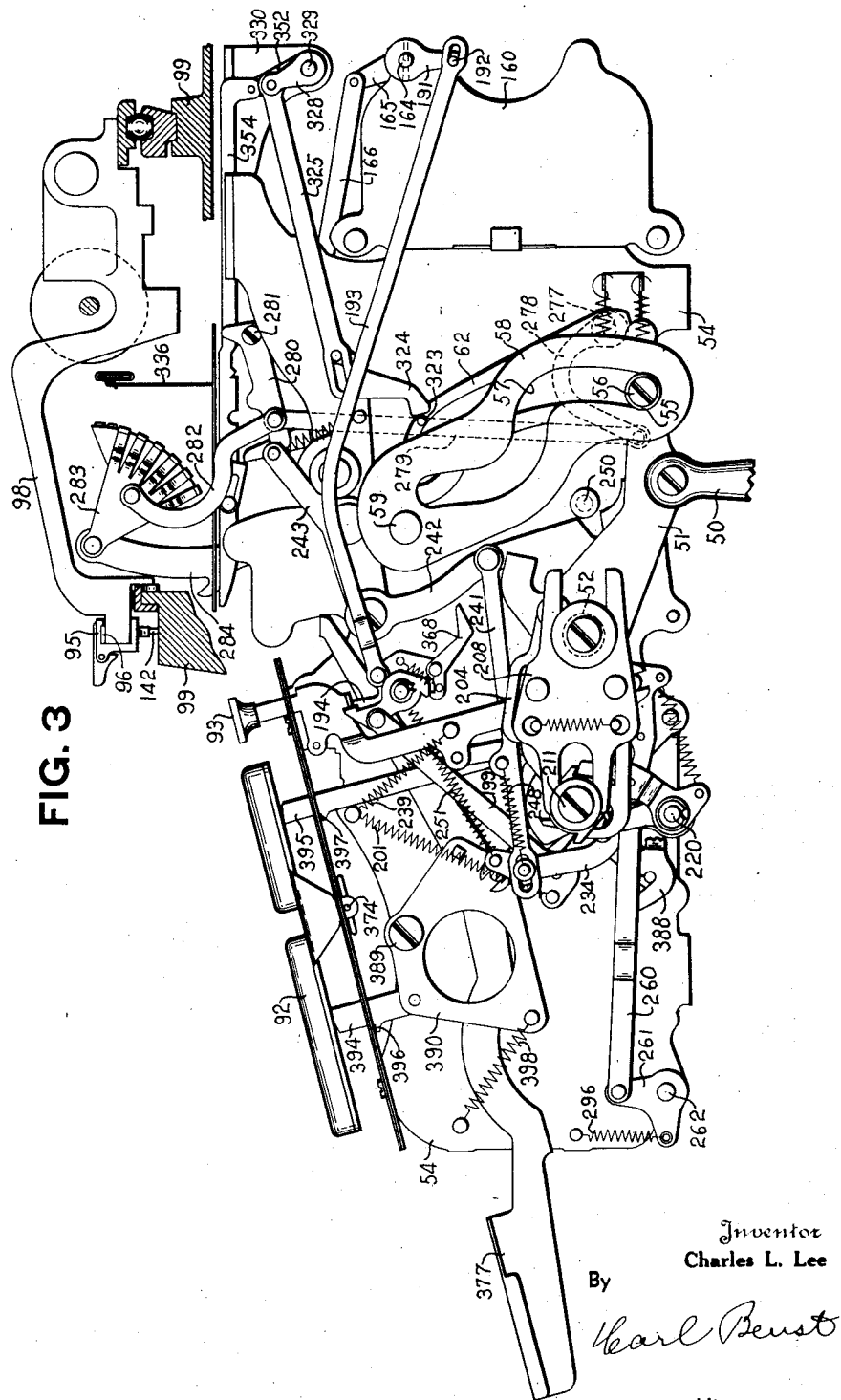

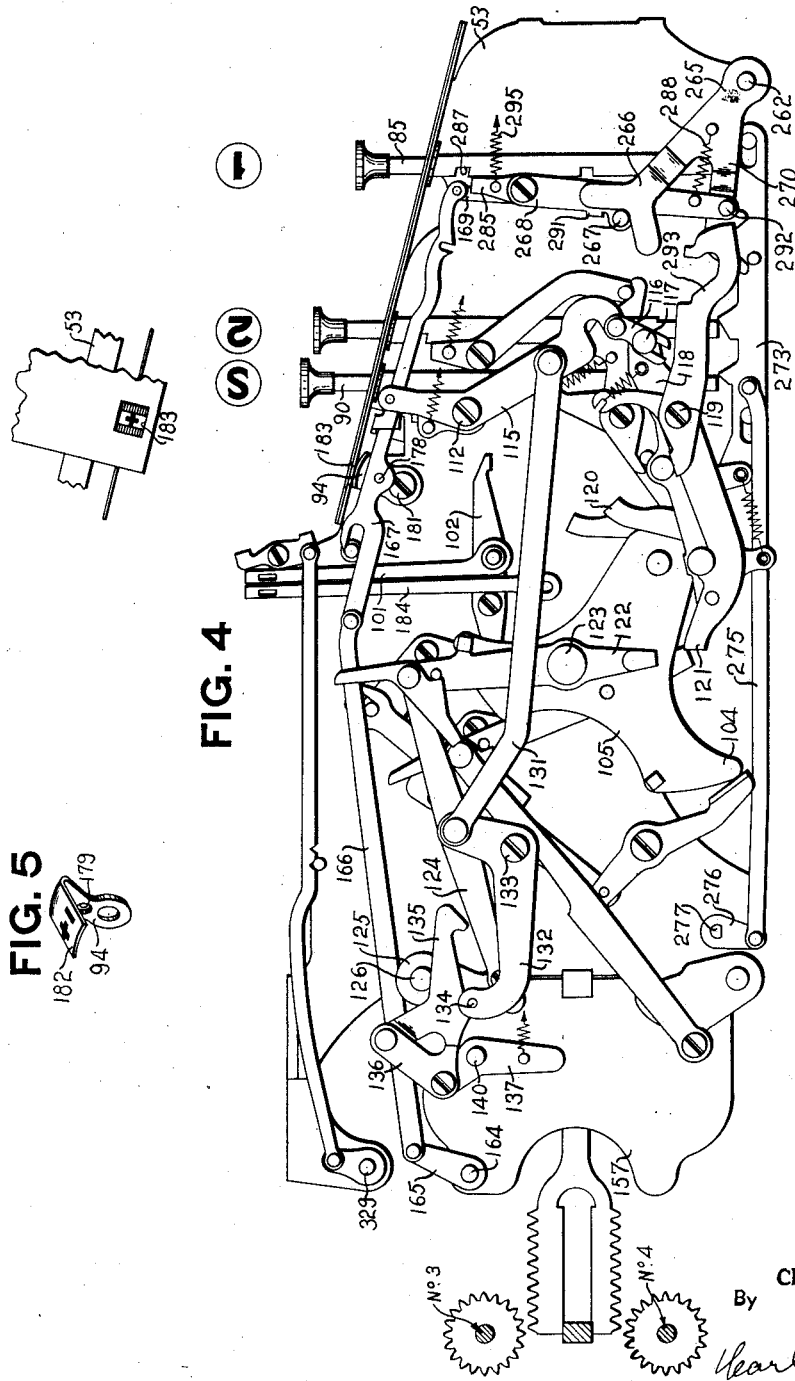

May 4, 1937.  C. L. LEE  2,079,355
AUTOMATIC OVERDRAFT DEVICE FOR CALCULATING MACHINES
Filed April 14, 1932  14 Sheets-Sheet 5

Inventor
Charles L. Lee
By
Pearl Beust
His Attorney

May 4, 1937.  C. L. LEE  2,079,355
AUTOMATIC OVERDRAFT DEVICE FOR CALCULATING MACHINES
Filed April 14, 1932   14 Sheets-Sheet 6
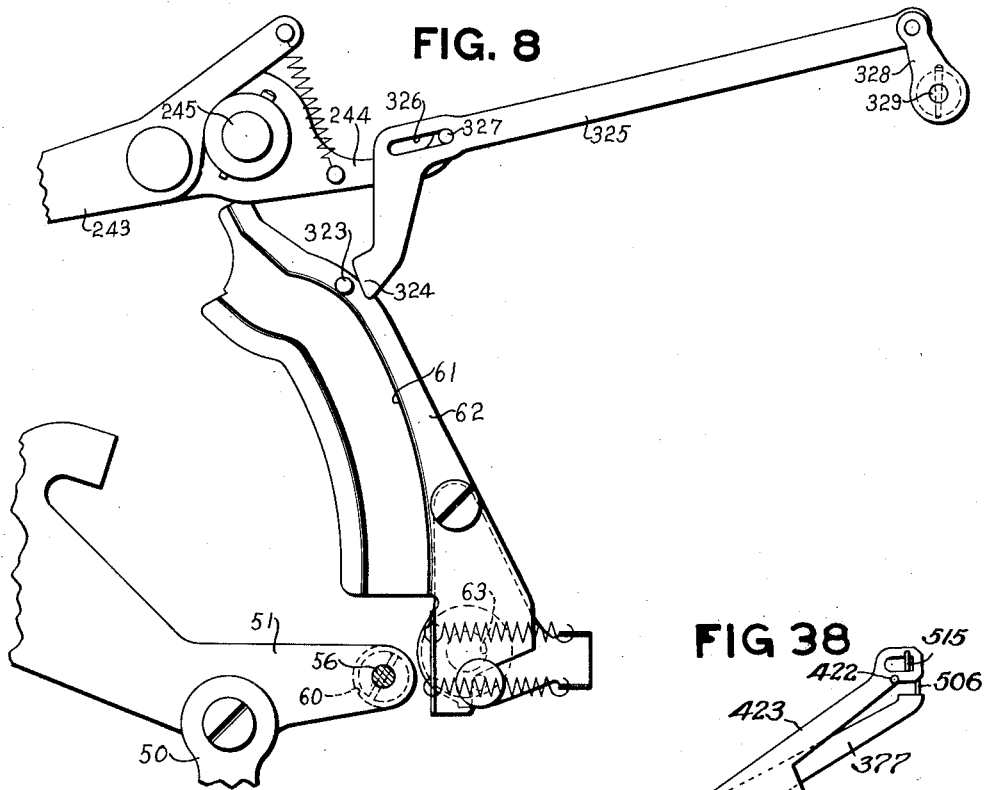
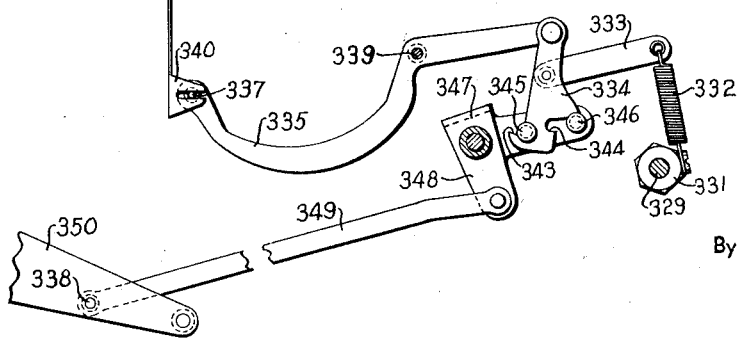
Inventor
Charles L. Lee
By
Pearl Beust
His Attorney

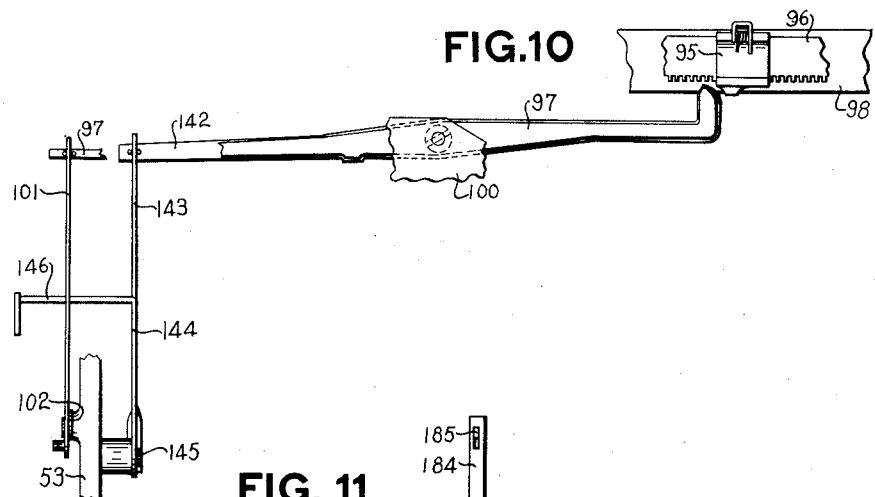
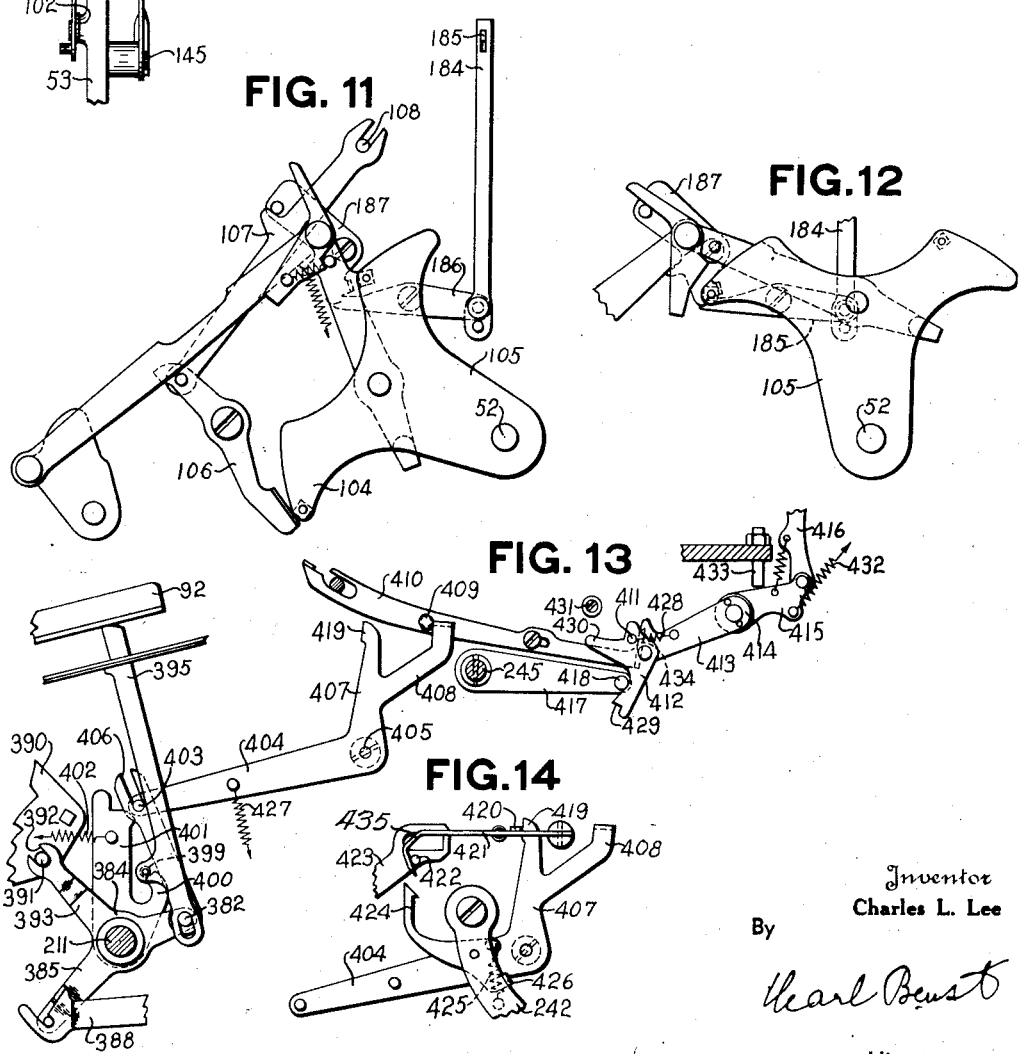

Inventor
Charles L. Lee
By
Carl Benst
His Attorney

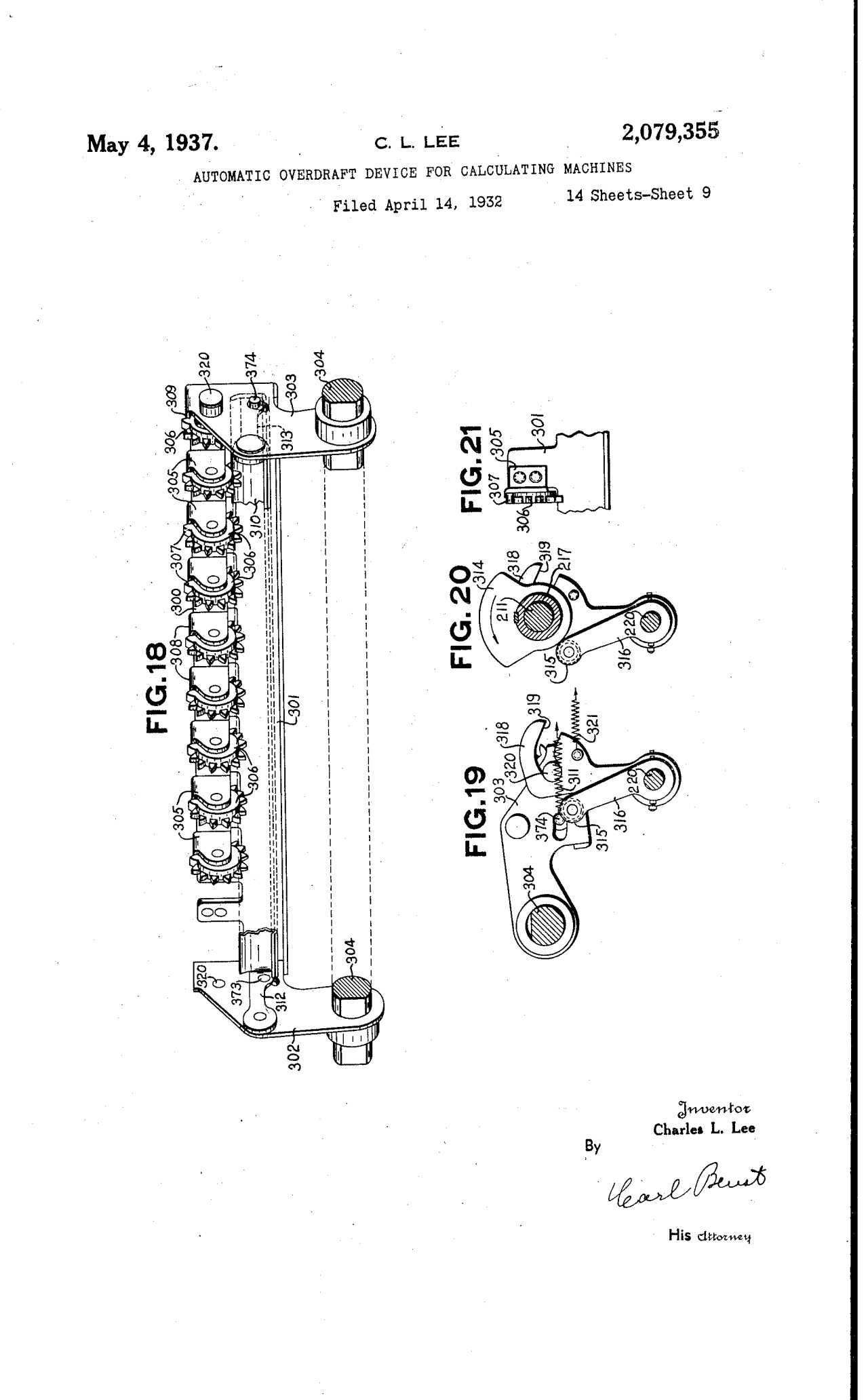

May 4, 1937.  C. L. LEE  2,079,355
AUTOMATIC OVERDRAFT DEVICE FOR CALCULATING MACHINES
Filed April 14, 1932  14 Sheets-Sheet 10
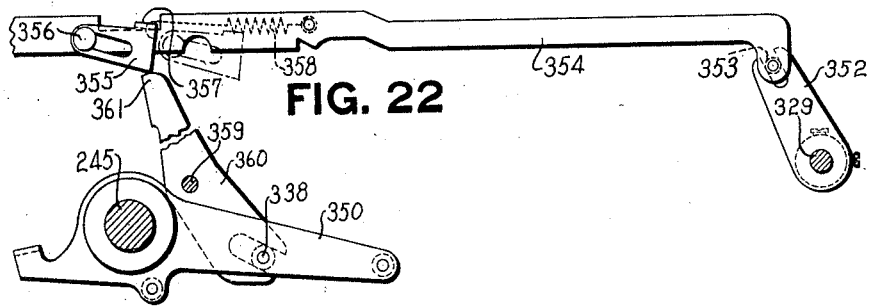
FIG. 22
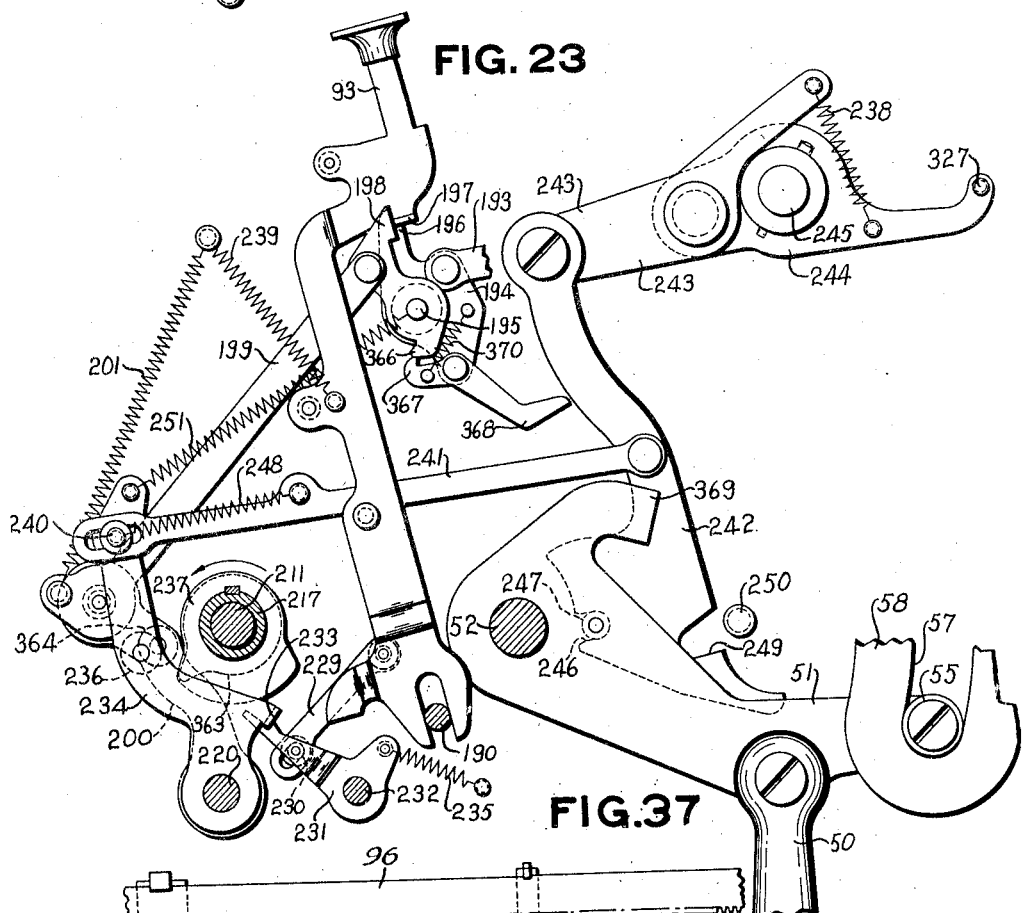
FIG. 23
FIG. 37
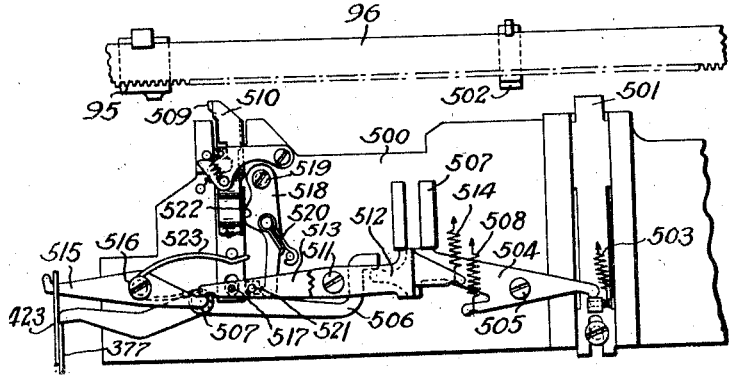
Inventor
Charles L. Lee
By
Carl Brust
His Attorney May 4, 1937.  C. L. LEE  2,079,355
AUTOMATIC OVERDRAFT DEVICE FOR CALCULATING MACHINES
Filed April 14, 1932  14 Sheets-Sheet 11
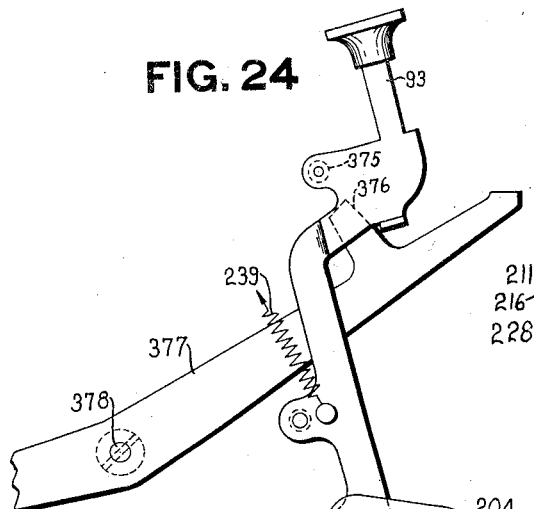
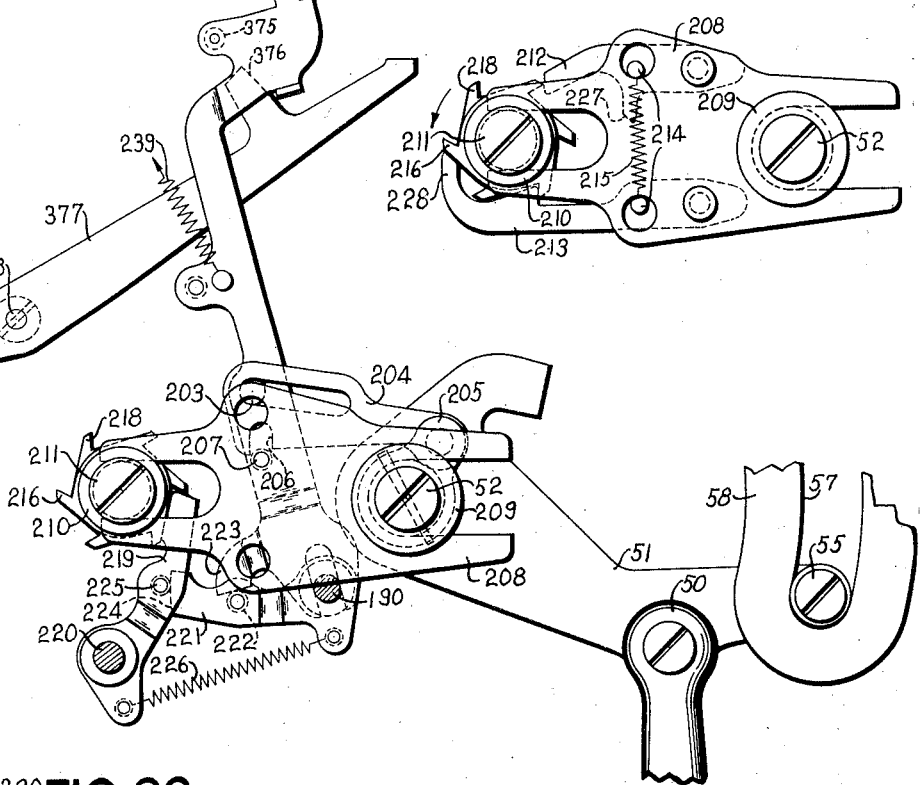
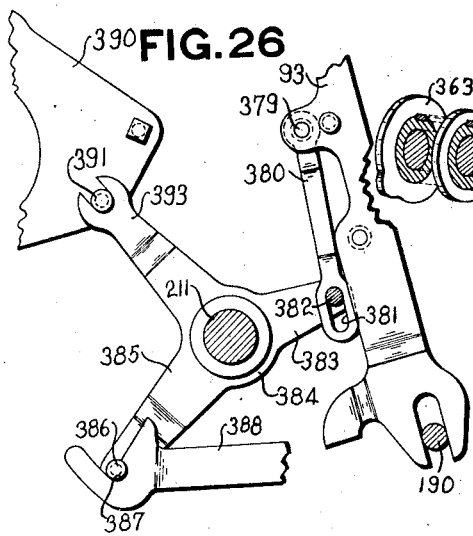
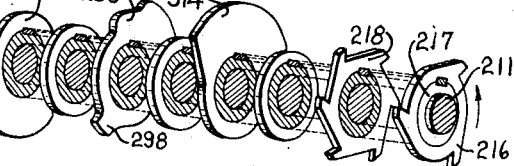
Inventor
Charles L. Lee
By
Carl Beust
His Attorney May 4, 1937.  C. L. LEE  2,079,355
AUTOMATIC OVERDRAFT DEVICE FOR CALCULATING MACHINES
Filed April 14, 1932   14 Sheets-Sheet 12

Inventor
Charles L. Lee
By
His Attorney

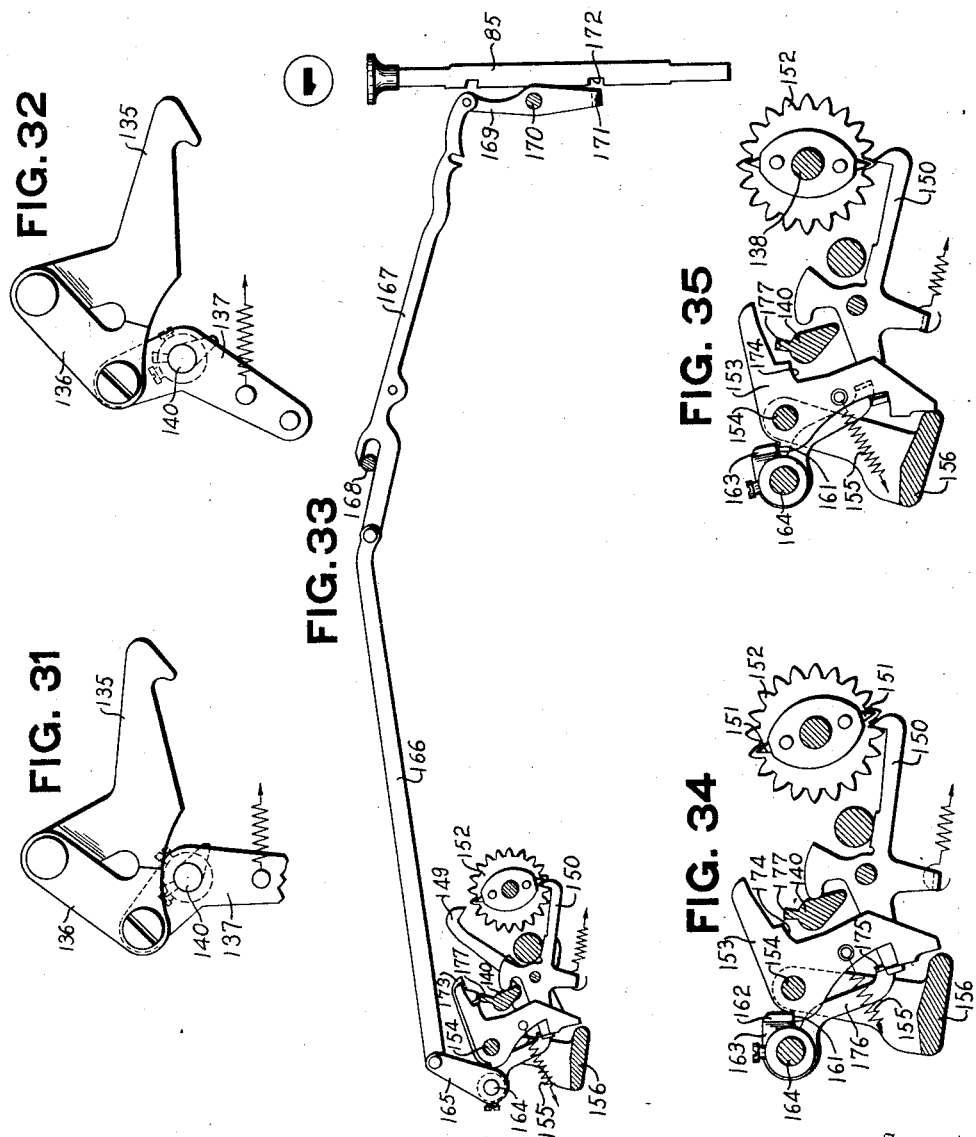

May 4, 1937.    C. L. LEE    2,079,355
AUTOMATIC OVERDRAFT DEVICE FOR CALCULATING MACHINES
Filed April 14, 1932    14 Sheets-Sheet 14

FIG. 36

Inventor
Charles L. Lee
By
Earl Beust
His Attorney

Patented May 4, 1937

2,079,355

UNITED STATES PATENT OFFICE 2,079,355

AUTOMATIC OVERDRAFT DEVICE FOR CALCULATING MACHINES

Charles L. Lee, Dayton, Ohio, assignor to The National Cash Register Company, Dayton, Ohio, a corporation of Maryland Application April 14, 1932, Serial No. 605,160

23 Claims. (Cl. 235—60)

This invention relates to adding typewriters of the Ellis type, which are illustrated and described in Letters Patent of the United States Nos. 1,197,276 and 1,197,278 issued September 5, 1916 to Halcolm Ellis, Patent No. 1,203,863, also issued to Halcolm Ellis November 7, 1916, and Patent No. 1,819,084 issued to Emil John Ens on August 18, 1931.

The present invention is incorporated in a machine of the well known Ellis type, preferably one having a traveling carriage, and if desired may be equipped with typewriter attachment. Such a machine usually has two to four totalizers, one of which is of the add-subtract type as set out in the Ellis Patent No. 1,203,863, and is arranged to accumulate positive or negative amounts at the will of the operator.

A machine of this type is well adapted for use in banking establishments where deposits and withdrawals are constantly being made upon individual checking accounts and furnishes a means whereby these different accounts may be accurately and rapidly balanced.

The general procedure in using a machine of this character in the banking business is as follows:

A record sheet for the depositor whose account is to be balanced is inserted in the machine in such a manner that the proper line is in position to be printed upon. The old balance appearing upon the record sheet is then entered into the add-subtract totalizer, next the checks issued by the depositor are subtracted from this old balance and simultaneously listed individually, and if desired may be added into one of the remaining totalizers of the machine, the reading of which gives the total amount of the checks listed.

Three columns are provided in the instant machine for the listing of checks. The traveling carriage may be tabulated from one column to the next, or the paper may be fed vertically at the discretion of the operator. The next step is the adding of any deposits made intermediate balancing periods, which are, as a general rule, daily. The operator then takes a total of the add-subtract totalizer to get a new balance, which is printed in the extreme righthand column of the record sheet.

The occurrence of an overdraft in the add-subtract totalizer is immediately called to the attention of the operator by means of an indicator visibly mounted below the keyboard of the machine. Likewise the occurrence of an overdraft automatically locks the total key for the add-subtract totalizer and unlocks an overdraft key, thus making it impossible to take a total of the add-subtract totalizer while said totalizer is in an overdrawn condition.

In former Ellis machines, after having ascertained that an overdraft had occurred and manually unlocking the total key for the add-subtract totalizer by manipulating the decimal slide, or by depressing the color shift button, the operator could then print the complement of the overdraft by taking a total or sub-total of the add-subtract totalizer. If desired, the operator could ascertain the positive amount of the overdraft by subtracting the complement from zero either mentally or by hand. In case it was necessary to print the amount of the overdraft positively on the record sheet or statement the operator was required to make three successive machine operations; first, to transfer the negative amount or complement of the overdraft from the subtract totalizer to an adding totalizer which had previously been cleared; second, subtract the negative amount from the subtract totalizer, which was reset to zero in the first operation; and, third, take a total or sub-total of said totalizer to print positively the amount of the overdraft.

In the machine of the present invention, upon ascertaining that an overdraft exists the operator may if she sees fit continue the balancing of the account or immediately discontinue such balancing. In either case the depression of the overdraft key causes the machine to automatically operate through three cycles to print the amount of the overdraft in positive fashion upon the record sheet.

Among the objects of the present invention are these: to provide mechanism for visibly indicating an overdrawn condition of the add-subtract totalizer, to provide mechanism whereby the operation of a single manipulative member will cause the machine to operate through three successive cycles to obtain a positive printing of the overdraft as outlined above, to supply means for automatically disabling the printing mechanism during the first and second cycles of an overdraft operation, to provide an auxiliary differential mechanism into which the complement of an overdraft may be temporarily stored, and to supply various interlocks between the overdraft key and the add-subtract totalizer and between the overdraft key and tabulating lever.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 2 is a section through the machine taken to the right of an amount bank looking toward the left, showing the location of the auxiliary differential.

Fig. 3 is an elevation of the righthand side of the machine with case removed.

Fig. 4 is an elevation of the left side of the machine with case removed.

Fig. 5 is a perspective view of the overdraft indicator.

Fig. 6 shows the location of the overdraft indicator as observed from above the keyboard.

Fig. 8 is a detail of the automatic ribbon shifting mechanism.

Fig. 9 is a detail view of the ribbon vibrating mechanism.

Fig. 10 is a detail view showing a fragment of the carriage stop bar with a stop in place thereon, and an add and subtract hanging bar lever.

Fig. 11 is a detail of the totalizer operating plate in home position.

Fig. 12 illustrates the position of the operating plate when the machine has operated through one-half its cycle.

Fig. 13 shows a fragment of the double motor bar and connecting mechanism for blocking the automatic tabulating mechanism.

Fig. 14 is a detail of the tabulating release mechanism.

Fig. 18 is a view in perspective of the auxiliary differential.

Fig. 19 shows in detail part of the engaging mechanism for the auxiliary differential.

Fig. 20 is a detail of the auxiliary differential engaging cam.

Fig. 21 illustrates the method of stopping the auxiliary differential wheels at zero.

Fig. 22 is a detail view of the ribbon restoring mechanism.

Fig. 23 illustrates in detail part of the overdraft mechanism.

Fig. 24 shows in detail the method of driving the overdraft cam line.

Fig. 25 is a detail of the overdraft cam line driving pitman.

Fig. 26 is a view in detail showing the overdraft machine release mechanism.

Fig. 27 is a disunited perspective view of the overdraft cam line.

Fig. 28 is a sectional view of the overdraft cam line.

Fig. 31 is a detail view of the subtract totalizer shifting line in its add position.

Fig. 32 is a detail view of the subtract totalizer shifting line in subtract position.

Fig. 33 is a detail in reduced scale of the overdraft locking mechanism by the total key of the subtract totalizer.

Fig. 34 is a full-size detail of the locking mechanism shown in Fig. 33 prior to being tripped.

Fig. 35 is an illustration of the mechanism shown in Fig. 34 after being tripped by an overdraft occurring in the add-subtract totalizer.

Fig. 36 is a perspective view showing the automatic overdraft controlling mechanisms and their relation to the machine side frames, the latter being shown in phantom.

Figure 1:
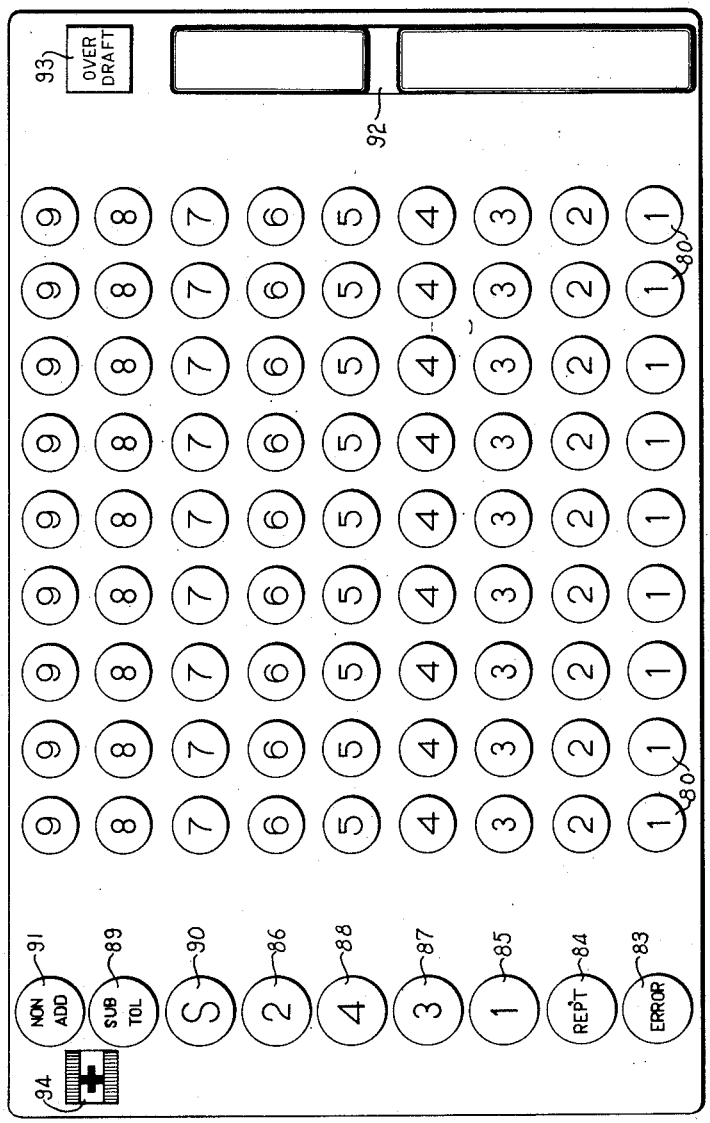
Fig. 1 is a plan view showing the layout of the keyboard.

In the figure showing the frame work in phantom by dot and dash lines, where the dot and dash lines do not show behind the parts it indicates that such parts are in front of the frames, but where the dot and dash lines are shown crossing the full line parts it indicates that such parts are behind the frames.

Fig. 37 is a detail view of a tabulating mechanism.

Fig. 38 is a detail view of the tabulating operating levers.

General Description

Described in general terms the machine of the present invention comprises a plurality of totalizers actuated in add operations by key-set actuator racks which also position the printing segments in accordance with the keys depressed. In total operations the actuator racks turn the totalizers to zero and position the printing segments commensurate with the amount on said totalizer wheels.

The mechanism of the Ellis machine is operated by a constantly running electric motor of conventional design, such as shown in the U. S. Patent to N. W. Perkins No. 1,136,165 dated April 20, 1915 which is clutched to the machine operating mechanism by the manipulation of a starting bar and is automatically declutched after said mechanism completes its cycle of operation.

The starting bar of the instant machine is pivoted near its center to make it double-acting. Depression of the upper end of said bar simultaneously releases the machine for operation and causes the platen roll to line-space the paper wound thereon. Depression of the lower end of the starting bar likewise releases the machine for operation, and simultaneously causes the traveling carriage to tabulate from one column to another.

The keyboard is arranged substantially the same as other adding machine keyboards, and has a plurality of control keys which select the different totalizers for particular operations and a plurality of amount keys for properly positioning the totalizer actuating racks in add, non-add and subtract operations.

An overdraft indicator is visibly mounted beneath the keyboard and shows at all times whether the add-subtract totalizer is in a positive or negative condition.

An auxiliary storage differential has been incorporated in the present machine and is arranged to cooperate with the actuator racks during an overdraft operation. The complement of the overdraft is first transferred from the add-subtract totalizer to the auxiliary storage differential. This complement is then subtracted from the cleared add-subtract totalizer, which results in the positive setting up of the amount of the overdraft.

An overdraft key is conveniently located on the upper right hand corner of the keyboard and is arranged to exercise complete control over the machine during overdraft operations. Depression of this key causes the machine to automatically operate through the three cycles necessary in overdraft operations in order to transpose a negative overdraft into a positive amount and to print such positive amount. Depression of the overdraft key also causes the printing mechanism to be disabled for the first and second cycles of an overdraft operation and effectively engages the auxiliary differential with the actuator racks. This key also controls mechanism that shifts the ink ribbon to a position where an overdraft will be printed in a distinctive color.

The instant machine has a traveling carriage which carries a tabulating bar upon which stops may be arranged as desired to automatically control the functions of the different totalizers in tabulated positions of said traveling carriage.

The machine in which the present invention is incorporated is equipped with automatic carriage return, manual tabulating mechanism and various other features usually found on machines of this type.

DETAIL DESCRIPTION
Operating mechanism

As previously stated, the mechanism of the Ellis machine is driven by an electric motor of the type shown in the above mentioned Perkins Patent No. 1,136,165 which runs continuously during machine operations. This motor is geared to a driving member of a clutch, not illustrated. An operating link 50 (Figs. 3 and 23) is pivoted on its lower end to a crank stud secured in a driven member of the clutch mechanism, neither of which is here shown. The upper end of the operating link is pivoted to an operating arm 51 secured to a shaft 52, journaled in a pair of main frames 53 and 54 (Figs. 3 and 7) between which the mechanism of the machine is supported. The main frames are secured to a machine base (not shown) to which is also secured the electric driving motor.

A roller 55 (Figs. 3 and 23) mounted on a stud 56 carried by the arm 51 cooperates with a slot 57 in a plate 58 secured to a shaft 59 also journaled in the main frames 53 and 54. Mounted on the left side of the arm 51 upon the stud 56 is another roller 60 (Fig. 8) adapted to cooperate with a cam race 61 formed in a cam plate 62, flexibly connected to an aliner shaft 63 likewise supported by the main frames 53 and 54.

Secured to the shaft 59 (Fig. 2) is a leading frame 64. Pivoted on the shaft 59 is a plurality of reducing arms 65. A plurality of springs 66 are tensioned to hold the reducing arms in contact with the leading frame 64. Secured in each reducing arm 65 is a stud 67 which cooperates with a vertical slot 70 in a plurality of actuator racks 71 for a purpose to be later described. An arm 72 of the reducing arm 65 is connected by a link 73 to the printing segment 74. Another arm 75 of the reducing arm 65 has secured therein a stud 76 which cooperates with an extension 77 of an order hook 78 pivoted on a shaft 79. There is one such reducing arm 65, actuator rack 71 and printing segment 74 for each amount bank of the machine. Secured to the shaft 63 is an aliner 68 adapted to cooperate with teeth cut in the reducing arms 65 for the purpose of holding said reducing arms in proper alignment while an impression is being made by the printing segments. In adding and non-adding operations, each time the machine operates, the actuator racks 71 (Fig. 2) follow the leading frame 64 rearwardly until one of the steps 82 contacts the studs 81 in depressed amount keys 80. This, through the slots 70 in the racks 71 and studs 67 in the reducing arms 65, positions said reducing arms in accordance with the keys depressed, the reducing arms in turn position the printing segments commensurate with the values of the depressed keys.

In total taking operations the actuator racks are positioned by long teeth on the totalizer wheels coming in contact with their respective trip pawls and this likewise positions the printing segments in accordance with the amount standing in the totalizer. For a complete description of the above mechanism reference may be had to the Ellis Patent No. 1,176,276 referred to at the beginning of this specification.

KEYBOARD
Amount keys

The keyboard of the present machine is similar to that of former Ellis machines, and has a plurality of amount keys 80 (Figs. 1 and 2) arranged in rows, each of which constitutes a denominational group or bank, such as units of cents, tens of cents, etc. These keys are "flexible" in that after one key has been depressed in a certain row the depression of another key in that row releases the one previously depressed, and so on. Each amount key 80 has secured therein a stud 81 adapted to cooperate with one of a plurality of steps 82 cut in the forward end of the rack 71, to position said racks in accordance with the amount keys depressed as explained above.

Control keys

Referring to Fig. 1, at the left of the keyboard is a row of keys adapted to control the selection and functions of the different totalizers.

An error key 83 is arranged to release any depressed amount or control key prior to release of the machine for operation, which automatically locks said error key against depression.

The repeat key 84 functions in the usual manner to prevent the automatic release of depressed amount keys in add, non-add and subtract operations.

A series of keys 85, 86, 87 and 88 (Fig. 1) are total keys for the different totalizers and when used alone control the machine to clear the totalizer they represent. When one of the total keys is used in conjunction with a sub-total key 89, the totalizer is not left in a cleared position after reading as in total operations, but is restored to its original condition.

A subtract key 90 conditions the add-subtract totalizer for subtract operations, as explained in the above referred to Ellis Patent No. 1,203,863.

A non-add key 91 operates in the usual manner to disable all the totalizers when it is desired to print an amount or number without having such amount or number stored in one of the totalizers.

On the righthand side of the keyboard is a starting bar 92 which simultaneously releases the machine for operation and causes the paper wound on the platen to be either line-spaced or fed laterally from one column to the next, as the operator desires. The starting bar and mechanism connected thereto will be hereinafter explained in detail.

An overdraft key 93 (Figs. 1 and 36) located on the right of the keyboard is used to condition and release the machine for an overdraft operation. The manner in which this key functions will also be explained later in this specification.

Overdraft indicator

Mounted below the keyboard and visible through an opening therein is an overdraft indicator 94 (Figs. 1 and 4) which shows at all times the condition of the add-subtract totalizer. This indicator displays a plus sign when the add-subtract totalizer is not overdrawn and a minus sign when said totalizer is in an overdrawn condition. A detailed description of the mechanism which operates the overdraft indicator will be given later in this specification.

Totalizer

The machine in which the present invention is incorporated has four totalizers arranged vertically in pairs at the rear of the machine. For convenience these different totalizers will be numbered as has heretofore been the custom. The upper front totalizer will be called No. 1, the lower front No. 2, (Fig. 2) the upper rear No. 3, and lower rear No. 4 (Fig. 4).

In the instant machine the upper front or No. 1 totalizer is arranged for both add and subtract operations while the other three totalizers are adapted only for adding operations. As the manner in which the adding totalizers function has been fully set out in the above referred to Ellis patents, it is thought unnecessary to go into further detail regarding them at this time. However, a brief explanation will now be given of the No. 1 add-subtract totalizer and the mechanism connected therewith.

Figure 16:
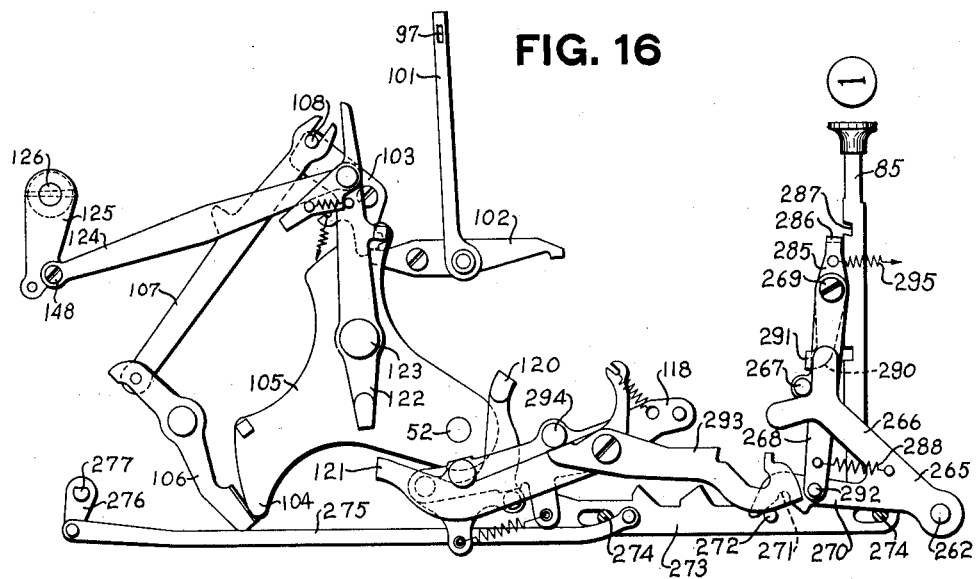
Fig. 16 is a detail of the automatic controlling mechanism for the overdraft totalizer.

In the present machine selection of the No. 1 totalizer for add operations may be made only by means of a series of stops 95 (Figs. 3 and 10) only one of which is here shown, spaced as desired on a tabulating stop bar 96 secured to a traveling carriage 98 slidably mounted on a machine case 99. In use, the traveling carriage is tabulated to a position where one of the stops 95 contacts the upturned end of an add hanging bar lever 97 (Fig. 10) pivotally mounted on a tabulating frame 100 to rock said lever clockwise. An add hanging bar 101 (Figs. 10 and 16) connects the hanging bar lever 97 to a controlling latch 102 pivoted to the left machine frame 53 to rock said latch counter-clockwise to release an add controlling crank 103 (Fig. 16) to condition the No. 1 totalizer for an add operation. The controlling crank 103 is restored to normal position near the end of each machine operation by a nose 104 on an operating plate 105 secured to the shaft 52 contacting and rocking clockwise a lever 106. A pitman 107 is pivoted to the lever 106, its upper end being bifurcated to embrace a stud 108 fast in the controlling crank 103. Thus, the clockwise rocking of the lever 106 also rocks the controlling crank 103 clockwise until the latch 102 under spring tension reengages said controlling crank 103 to retain it in home position.

Figure 15:
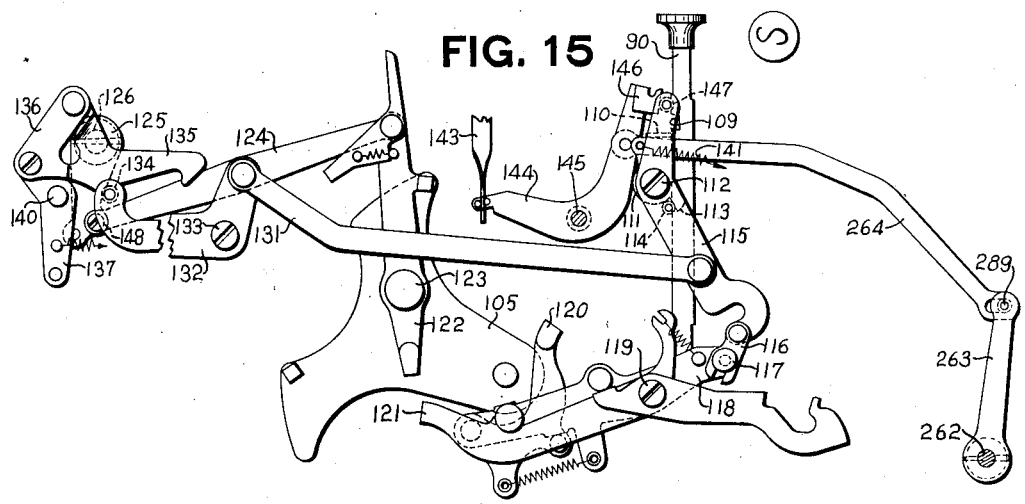
Fig. 15 is a view showing in detail the subtract control and operating mechanism.

The No. 1 totalizer may be conditioned for subtract operations either by depression of the subtract key 90 (Fig. 1) or by arranging stops on the tabulating stop bar 96 (Figs. 3 and 10). Referring to Figs. 4 and 15, the subtract key 90 has therein a notch 109 adapted to receive an ear 110 bent on a latch 111 pivoted on a stud 112 carried by the left machine frame 53. A projection 113 on the latch 111 cooperates with a stud 114 fast in a toggle lever 115 also pivoted on the stud 112. Pivoted on the lever 115 is an arm 116 having an open-ended slot through which extends a stud 117 fast in a lever 118 (Figs. 15 and 16) pivoted on a stud 119 fast in the frame 53.

Figure 7:
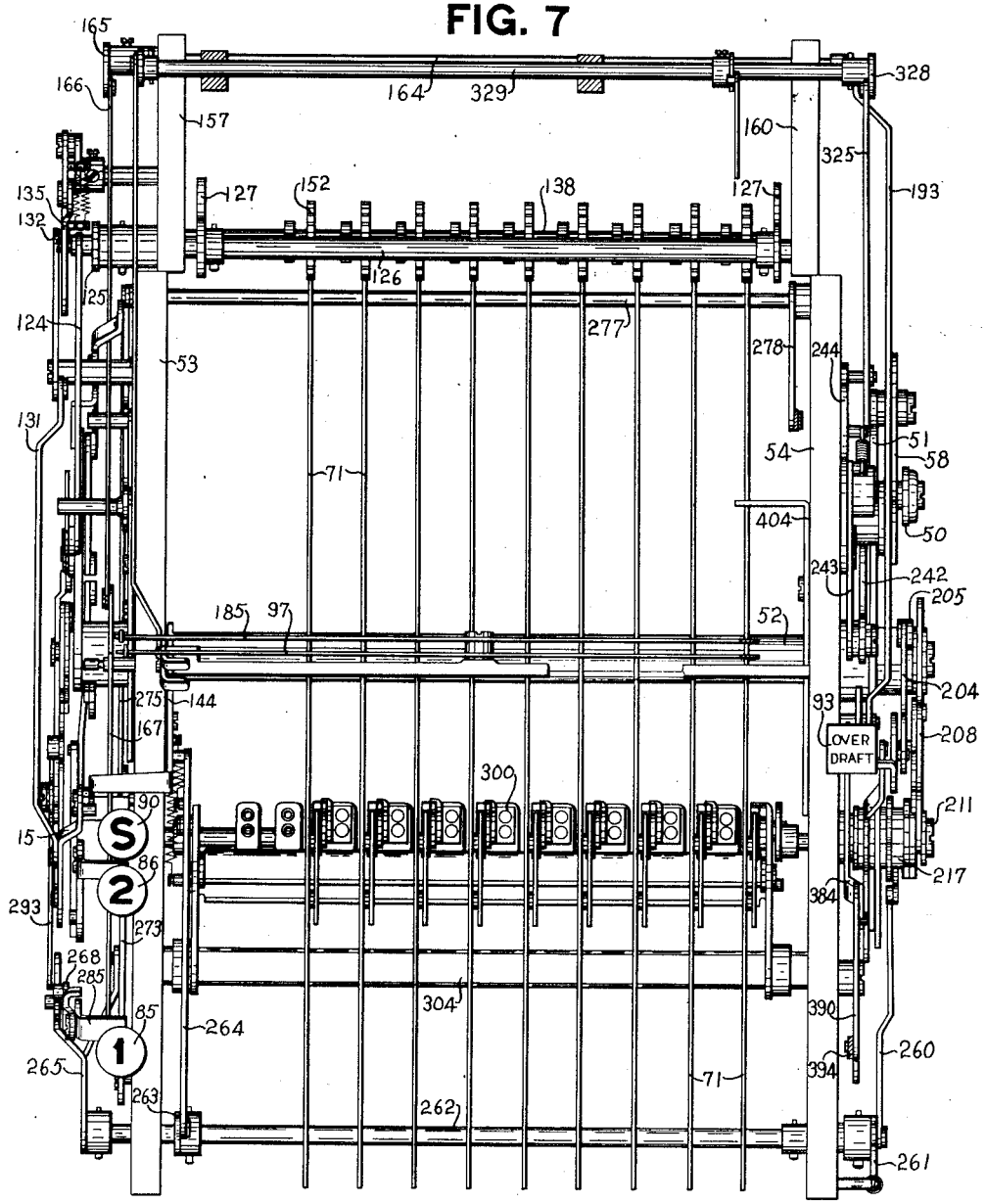
Fig. 7 is a top plan view illustrating the side spacing of the various parts of the machine.
Figure 17:
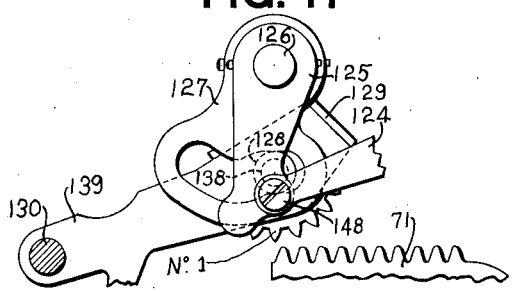
Fig. 17 is a detailed view of the totalizer engaging cam.
Figure 29:
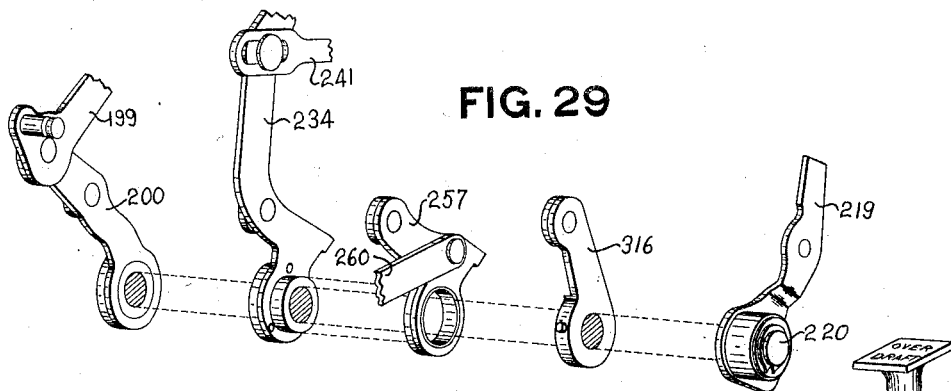
Fig. 29 is a section disunited perspective view of the overdraft operating mechanism.

A pair of flexibly mounted pawls 120 and 121 carried by the lever 118 are arranged to cooperate with the lower end of a flying lever 122 pivoted on a stud 123 carried by the operating plate 105. A link 124 pivotally connects the lever 122 to a crank 125 secured to a shaft 126 journaled in a pair of totalizer frames 157 and 160 (Fig. 7). Secured on the shaft 126 is a pair of cams 127 (Figs. 7 and 17) adapted to cooperate with rollers 128 one being loosely assembled on each end of the No. 1 totalizer shaft 129. Two arms 130, one only here shown, connected by a ball 131 and pivoted on a pair of studs 130 secured in the totalizer frames 157 and 160 forms a rockable frame for supporting the add-subtract totalizer shaft 129.

A link 131 (Figs. 4 and 15) pivotally connects the lever 115 to another lever 132 pivoted at 133 to the left machine frame 53. Fast in an arm of the lever 132 is a stud 134 arranged to cooperate with the lower edge of a shift bar operating latch 135. The latch 135 is flexibly connected to an arm 136 pivoted to a bell crank 137 secured to a shift bar shaft 140 journaled in the totalizer frames 157 and 160.

Depression of the subtract key 90 causes the latch 111 and lever 115 under tension of a spring 141 to rock clockwise, thus rocking the levers 116 and 118 clockwise to place the pawls 120 and 121 in the path of the flying lever 122. Contact of the flying lever 122 with the pawl 121, caused by the initial movement clockwise of the operating plate 105, through the link 124 (Fig. 17) and crank 125, turns the shaft 126 and cams 127 counter-clockwise to properly engage the No. 1 totalizer wheels with the actuator racks 71 for a subtract operation. The rocking of the lever 115 (Fig. 15) also displaces the stud 134, allowing the latch 135 to drop into position to be drawn forwardly by the stud 148 to set the transfer mechanism for a subtract operation in the usual manner. The return or counter-clockwise movement of the operating plate 105 causes the flying lever 122 to engage the pawl 120 to rock the shaft 126 and cams 127 clockwise to disengage the No. 1 totalizers from the actuator racks.

Likewise the proper setting of one of the stops 95 on the tabulating stop bar 96 (Figs. 3, 10 and 15), when the traveling carriage is tabulated to a particular position, will rock a subtract hanging bar lever 142 clockwise. A subtract hanging bar 143 pivotally connects the lever 142 to an arm of a subtract operating lever 144 pivoted at 145 to the left machine frame 53. An arm 146 of the lever 144 is bent twice at right angles to straddle the left machine frame and cooperates with a stud 147 (Fig. 15) secured in the lever 115. Thus the clockwise rocking motion of the lever 142 is transmitted to the lever 144 and then to the lever 115, rocking the latter clockwise independently of the latch 111. This causes the No. 1 totalizer to be properly engaged with and disengaged from the actuator rack 71 in the same manner as the depression of the subtract key 90 previously explained.

Rocking the lever 115 clockwise either by depressing the subtract key 90 (Fig. 15) or by means of the traveling carriage 98, through the link 131 rocks the lever 132 counter-clockwise thus allowing the hook on the arm 135 to move into the path of a stud 148 carried by the crank 125. Initial movement clockwise of the plate 105, as previously explained, through the flying lever 122 and link 124 will now rock the crank 125 counter-clockwise causing the stud 148 to engage the hook shaped arm 135 and rotate the shaft 140 from the position shown in Fig. 31 to that shown in Fig. 32. This clockwise movement of the shaft 140 shifts a series of adding pawls 149 (Figs. 2 and 33) to ineffective positions, shifts a plurality of subtracting pawls 150 to effective positions and also shifts the carrying sector spring bail (not shown) to a position where the carrying sectors will be engaged by the subtract portion of a cam slot in a series of carrying cams (not here shown), but all of which is fully described in the Ellis Patent 1,203,-863, cited at the beginning of this specification.

Overdraft shaft operating mechanism

Referring to Figs. 34 and 35, during subtract operations the No. 1 totalizer wheels, as previously explained, are rotated clockwise. When an overdraft occurs one of the two diametrically opposed projections 151 on a highest order wheel 152 contacts the tooth on the subtracting pawl 150, rocking said pawl clockwise to release an overdraft shaft actuator 153 loosely mounted on a shaft 154. The actuator 153 moves clockwise under tension of a spring 155 until it contacts a restoring bar 156 pivoted between the totalizer frames 157 and 160 (Fig. 7). Prior to the above movement of the actuator 153 the bar 156 is moved into the position shown in Figs. 33 and 34. A projection 161 (Figs. 34 and 35) on the actuator 153 is arranged to contact an ear 162 formed on an arm 163 secured to an overdraft shaft 164 journaled in the totalizer frames 157 and 160.

Near the end of a machine operation the restoring bar 156 is released and under spring tension rocks to the position shown in Fig. 35 to allow any released transfer pawls to function. The overdraft actuator 153 also being under spring tension travels clockwise in unison with the restoring bar 156 whereupon the shoulder 161 moves the overdraft shaft 164 counter-clockwise. Fast on the overdraft shaft is an arm 165 (Figs. 4 and 33) pivotally connected by a link 166 to a pitman 167 having therein a slot that embraces a stud 168 secured in the left machine frame 53. The right end of the pitman 167 is pivoted to a latch 169 pivotally mounted on a stud 170 also secured in the left machine frame. The latch 169 has formed thereon an ear 171 (Fig. 33) arranged to enter a notch 172 in the No. 1 total key 85 to lock said key against depression when the overdraft shaft is rotated counter-clockwise by the occurrence of an overdraft as explained above.

If subsequent to an overdraft an amount large enough to over-balance the overdraft is added into the No. 1 totalizer, the adding pawl 149 (Figs. 2 and 33) for the highest order wheel 152 is engaged and rocked by one of the projections 151 on said wheel. This rocking of the adding pawl 149 releases an overdraft restoring lever 173 (Fig. 33) which under tension of a spring (not shown) contacts an ear 175 (Fig. 34) bent on an arm 176 integral with the arm 163 to rock the latter clockwise, thus restoring the overdraft shaft to normal position and unlocking the total key 85. The overdraft shaft actuator 153 and the restoring lever 173 are restored to normal position each time the machine is operated by means of the restoring bar 156. The shift bar 140 has formed thereon a key 177, which during add operations lies beneath a shoulder 174 on the overdraft shaft actuator 153 and prevents any movement of the latter, and at the same time frees the overdraft restorer 173 since said key 177 is out of the path of the same. Moving of the shift bar 140 clockwise for subtract operations releases the overdraft shaft actuator and blocks the movement of the overdraft shaft restorer.

It is felt that further explanation of this mechanism is unnecessary, as it has been used in former Ellis machines and is fully described in Letters Patent of the United States No. 1,508,267, issued September 9, 1924 to F. W. Bernau and Patent No. 1,609,768 issued December 7, 1926 to N. W. Perkins.

Overdraft indicator mechanism

An explanation will now be given of the mechanism that operates the overdraft indicator.

Referring to Figs. 4, 5 and 6, in the pitman 167 is a stud 178 arranged to extend through a hole 179 in the overdraft indicator arm 194 pivoted on a screw stud 181 in the left machine frame 53. The arm 194 has an extension 182 upon which is engraved or printed a positive or plus sign and a negative or minus sign. This overdraft indicator is mounted below the keyboard plate in such a manner that either the plus or negative sign is at all times visible through an opening 183 in the keyboard plate.

When the overdraft shaft 164 is rocked counterclockwise, as viewed in Fig. 4, by the occurrence of an overdraft, the indicator is shifted to a position where the minus sign is visible through the opening in the keyboard plate. When the No. 1 totalizer is not in an overdrawn condition the plus sign is visible through the opening in the keyboard plate.

No. 2 totalizer engaging mechanism

Figs. 11 and 12 illustrate the mechanism for engaging the wheels of the No. 2 totalizer with the actuator rack and also the mechanism which cooperates with the traveling carriage to condition the No. 2 totalizer for add operations. As this mechanism is of conventional design it will be treated briefly in the following description. Connected by a hanging bar 184 (Fig. 11) to a hanging bar lever 185 is a controlling latch 186 which is arranged to cooperate with a controlling crank 187 to cause the No. 2 totalizer to be engaged with and disengaged from the actuator racks 71 at the proper time during an add operation in the same manner as the mechanism for the No. 1 totalizer, which was explained in the preceding description. Fig. 12 shows the position of the No. 2 totalizer engaging mechanism near the middle of a non-add operation.

Overdraft mechanism

In the present machine the occurrence of an overdraft automatically unlocks the overdraft key 93, which is normally locked against depression. If the operator wishes to ascertain the amount of an overdraft, all that is necessary is the depression of this key. Depression of the overdraft key 93 releases the machine for an overdraft operation, consisting of three cycles, and likewise causes the printing mechanism to be disabled during the first two cycles of operation. It also causes the auxiliary differential to be engaged with and disengaged from the actuator racks at the proper time and conditions the No. 1 totalizer for a total taking operation during the first cycle of operation, a subtract operation during the second cycle, and finally a second total taking operation during the third cycle of operation. The first cycle of an overdraft operation causes the total of the No. 1 totalizer, which total is the complement of the overdraft, to be temporarily added into the auxiliary differential. During the second cycle this complement is subtracted from the cleared No. 1 totalizer, leaving the positive amount of the overdraft in the No. 1 totalizer and clearing the auxiliary differential. The final or third cycle of an overdraft operation takes a total from the No. 1 totalizer and prints this total which is the positive amount of the overdraft, in a distinctive color on a record sheet interposed between the platen roll and the printing type. The overdraft mechanism is treated in detail in the following description.

*Locking mechanism for overdraft key*

The overdraft key 93 (Figs. 3, 23, 24 and 36) is slidably mounted by having its upper end extending through a slot in the keyboard plate and its lower end slotted to embrace a stud 189 secured in the right machine frame 54.

Secured to the righthand end of the overdraft shaft 164 (Figs. 3 and 36) is an arm 191 having therein a stud 192 which extends through a slot in a link 193. The left end of the link 193 (Figs. 23 and 36) is pivoted to a locking plate 194 pivotally mounted on a stud 195 fast in the right machine frame 54. The plate 194 has a step 196 adapted to cooperate with an ear 197 formed on the overdraft key 93, to normally lock said key against depression. As previously explained, the occurrence of an overdraft rocks the overdraft shaft 164 clockwise as viewed in Fig. 3. Such movement of the shaft 164, through the arm 191 and link 193 rocks the locking plate 194 counterclockwise, which removes the step 196 from the ear and unlocks the overdraft key.

Pivoted on the stud 195 (Figs. 23 and 36) is a detent 198 having a hook adapted to cooperate with the ear 197 on the overdraft key. A link 199 pivotally connects the detent 198 to a release cam arm 200 pivoted on a stud 220 secured in the right frame 54. A spring 201 is tensioned to pull the arm 200 and detent 198 clockwise. When the overdraft key 93 is depressed the projection on the detent 198 latches over the ear 197 thus retaining the overdraft key depressed during an overdraft operation. The manner in which the overdraft key is released and the overdraft shaft restored to normal position at the end of an overdraft operation will be later described.

*Overdraft cam line driving mechanism*

A series of cams for operating the overdraft mechanism has been incorporated in the present machine. These cams are rotatably mounted as a unit upon the right machine frame 54 and make one complete revolution for each overdraft operation. During normal machine operations the cams remain inoperative, the driving mechanism therefor being effectively coupled thereto only when the overdraft key is depressed. This overdraft cam driving mechanism will now be explained.

A stud 203 (Fig. 24) in the overdraft key 93 extends through a slot in a latch 204 pivoted to an arm 205 fast on the shaft 52. A notch 206 in the latch 204 is arranged to latch over a stud 207 fast in a reciprocable pitman 208 which is bifurcated on its right end to embrace an undercut portion of a slotted bushing 209 fast on the shaft 52. The left end of the pitman 208 is also bifurcated to embrace a slotted portion of a bushing 210 loosely mounted on a stud 211 carried by the frame 54. Pivotally mounted on the pitman 208 is a pair of pawls 212 and 213 (Fig. 25) each pawl having secured therein a stud 214 which extends through holes in the pitman. These holes are of correct size to properly limit the travel of the pawls 212 and 213, and form stops against which the studs 214 are held by a spring 215. The pawls 212 and 213 are adapted to cooperate with a three-toothed feed ratchet 216 (Figs. 24, 25 and 27) keyed to a hub 217 journaled on the stud 211. Also keyed to the hub 217 is a six-tooth retaining ratchet 218 adapted to cooperate with a retaining pawl 219 (Fig. 24) pivoted on the stud 220. A locking pawl 221 (Fig. 24) pivoted on the stud 190 has therein a stud 222 adapted to cooperate with a projection 223 on the overdraft key 93. An arcuate surface 224 on the pawl 221 is arranged to coact with a stud 225 carried by the retaining pawl 219. A spring 226 stretched between the pawls 219 and 221 holds the pawl 219 in contact with the teeth of the ratchet 218 and also normally holds the pawl 221 in a position where the arcuate surface 224 will be opposite the stud 225 thus locking the pawl 219 between two teeth of the ratchet 218 to prevent movement of the hub 217 at all times except during overdraft operations.

Depression of the overdraft key 93 (Fig. 24) rocks the pawl 221 counter-clockwise to release the retaining pawl 219 and causes the notch 206 in the latch 204 to engage the stud 207. The arm 51 oscillates through an approximate angle of 60 degrees each time the machine is operated. During an overdraft operation, inasmuch as the machine makes three operations, the arm 51 will make three oscillations. The first movement counter-clockwise of the arm 51 (Fig. 24) will through the arm 205 and latch 204 slide the pitman 208 to the left causing the pawl 212 (Fig. 25) to rotate the rachet 216, hub 217 and cam assembly keyed thereto one-sixth of a revolution counter-clockwise, or one tooth space on the retaining ratchet 218. The return movement clockwise of the arm 51 returns the pitman 208 to its home position, causing the pawl 213 to engage another tooth of the feed ratchet 216 to rotate the hub 217 another one-sixth revolution. The feed pawls 212 and 213 have projections 227 and 228, respectively, which cooperate with the feed ratchet 216 to prevent overthrow during fast operations.

Therefore, during the three cycles of an overdraft operation the cam assembly on the hub 217 will make one complete revolution in a counter-clockwise direction.

*Printer disabling mechanism*

Referring to Fig. 23, pivoted on the overdraft key 93 is a link 229 slotted on its lower end to embrace a stud 230 fast in a detent 231 pivoted on a stud 232 fast in the right machine frame 54. The detent 231 is notched to receive an ear 233 bent on a printer cam arm 234 pivoted on the stud 220. A spring 235 is tensioned to hold the detent 231 in engagement with the cam arm 234. A roller 236 carried by the arm 234 is adapted to cooperate with a printer cam 237 for a purpose and in a manner to be later described. A stud 240 fast in the arm 234 extends through a slot in one end of a link 241 (see also Fig. 36) pivoted to a printer operating link 242 pivoted to an arm 243 which in turn is pivotally connected to another arm 244 fast on a shaft 245. A spring 238 is tensioned to form a flexible connection between the arms 243 and 244. The lower end of the operating link 242 has a notch 246 arranged to be normally held in engagement with a stud 247 fast in the arm 51 by a spring 248. In the link 242 opposite the notch 246 is another notch 249 adapted to be latched over a stud 250 fast in the right machine frame 54. A spring 251 is tensioned between the arm 234 and stud 195 to normally hold the ear 233 in contact with the detent 231.

Depression of the overdraft key 93 (Fig. 23) through the link 229 rocks the detent 231 counter-clockwise and releases the cam arm 234 which under tension of the spring 251 moves clockwise until the roller 236 contacts the periphery of the cam 237. This movement of the arm 234 through the link 241 rocks the operating link 242 counter-clockwise, disengaging the notch 246 from the stud 247 and engaging the notch 249 with the stud 250. This prevents the printer shaft 245 from receiving movement from the operating arm 51 and locks said shaft in its home position during all of the first two cycles of an overdraft operation.

At the end of the second cycle of an overdraft operation the cam 237 engages the roller 236 and rocks the arm 234 counter-clockwise, reengaging the notch 246 with the stud 247 so that the printer shaft 245 will receive proper movement on the third or last cycle of an overdraft operation in order to print the overdraft.

When the ovedraft key is released near the end of an overdraft operation it is forced upward, by a spring 239, causing the detent 231 to re-engage the ear 233 on the arm 234 to retain operative connection between the arm 51 and the printer shaft 245 after the high point of the cam 237 passes beyond the roller 236 to its home position as shown in Fig. 23.

*Add-subtract totalizer controlling mechanism*

When an overdraft occurs in the No. 1 add-subtract totalizer the complement of the overdraft remains upon the totalizer wheels. In an overdraft operation the object is to print the amount of this overdraft in positive form, and to do this, as previously explained, requires three cycles of the machine. During the first cycle of an overdraft operation the No. 1 totalizer is automatically cleared and the complement of the overdraft simultaneously added into an auxiliary storage differential. In the second cycle, this complement is subtracted from the cleared No. 1 totalizer leaving the positive amount of the overdraft standing in the No. 1 totalizer. In the third and last cycle of an overdraft operation a total is taken from the No. 1 totalizer and this total simultaneously printed upon a statement or record sheet. The mechanism that controls the No. 1 add-subtract totalizer during an overdraft operation is well illustrated in Figs. 3, 7, 16, 27, 29 and 30 and will now be explained in detail.

Figure 30:
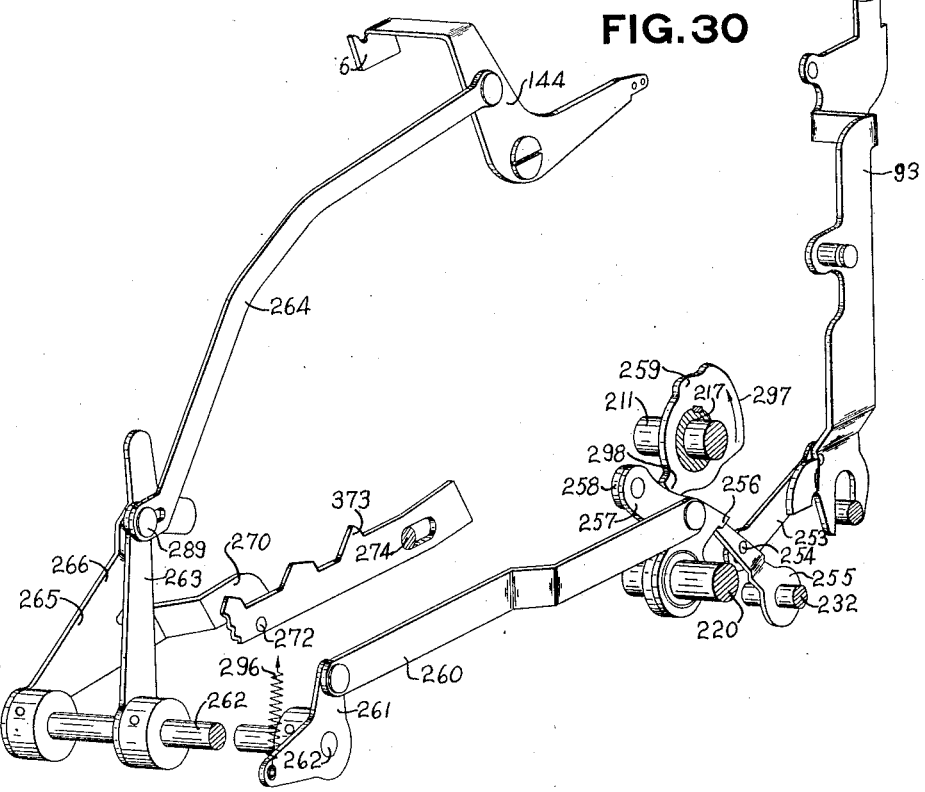
Fig. 30 is a perspective view of the subtract totalizer overdraft control mechanism.

Referring to Fig. 30, pivotally connected to the overdraft key 93 is a link 253 slotted to embrace a stud 254 fast in a detent 255 pivoted on the stud 232. The end of the detent 255 is notched to receive an ear 256 formed on a cam arm 257 loosely mounted on the stud 220, and having mounted thereon a roller 258 adapted to cooperate with a control cam 259 keyed to the hub 217. A link 260 (Fig. 36) pivotally connects the arm 257 to a bell crank 261 secured to a shaft 262 journaled in the main machine frames 53 and 54. A subtract operating arm 263 (Figs. 15, 30 and 36) fast on the shaft 262 carries a stud 289 to which is connected a link 264 also connected to the lever 144. Secured on the left end of the shaft 262 is a total operating lever 265 (Figs. 4, 16 and 30) having an arm 266 with two projections shaped to form a V which is adapted to cooperate with a stud 267 fast in a total latch arm 268 pivoted on a stud 269 fast in the left machine frame 53. A spring 288 is tensioned to hold the stud 267 centrally located in the V formed by the arm 266. Another arm 270 of the lever 265 has therein a notch 271 which cooperates with a stud 272 fast in a symbol selecting slide 273 reciprocably mounted on studs 274 carried by the frame 54. A link 275 (Fig. 16) pivotally connects the slide 273 to an arm 276 fast on the left end of a shaft 277 extending through the width of the machine and journaled in the two main frames 53 and 54. Secured to the right end of the shaft 277 just inside the right frame 54 is an arm 278 (Figs. 3 and 7) connected by a link 279 to an aligning arm 280 pivoted at 281 to a printer side plate (not shown). A link 282 conects the arm 280 to a symbol printing segment 283 pivoted to a printing arm 284.

A flexibly mounted latch 285 (Figs. 4 and 16) pivoted on the stud 269 has an ear 286 arranged to cooperate with a notch 287 in the No. 1 total key 85. A leg 290 of the latch 285 cooperates with an ear 291 on the latch arm 268. In the lower end of the arm 268 is a stud 292 adapted to engage a total cam lever 293 loosely mounted on the stud 191 and adapted to contact a stud 294 carried by the lever 118.

Depression of the overdraft key 93 (Fig. 30) disengages the detent 255 from the cam arm 257 allowing said arm 257, the arm 261, shaft 262, arm 263 and lever 265 to rotate clockwise, as viewed in Fig. 30, under tension of a spring 296 until the roller 258 on the cam arm 257 strikes the lowest part of the periphery of the cam 259. The above described movement of the lever 265 is counter-clockwise as viewed in Fig. 16, and causes the V-shaped arm 266, through the stud 267, to force the latch arm 268 clockwise independently of the latch 285.

As the arm 268 moves clockwise, the stud 292 rocks the cam lever 293 and its associated lever 118 clockwise. This places the pawls 120 and 121 in the path of the flying lever 122 so that the No. 1 totalizer will be engaged with the racks 71 and will be cleared during the first cycle of an overdraft operation. The amount cleared from the No. 1 totalizer is transferred to an auxiliary differential to be later described. Such amount represents the complement of the true overdraft. After such clearing of the No. 1 totalizer, it is disengaged from the racks 71 during the remainder of said first cycle. The above movement of the arm 268 is independent of the latch 285 and in no way affects the total key 85. Also, when the shaft 262 and arm 263 rock during total operations, the stud 289 (Figs. 15 and 30) moves idly in the slot in the link 264, and therefore rocking of the shaft and arm does not disturb the lever 144.

The periphery of the cam 259 (Fig. 30) co-acting with the roller 258 forces the arm 257 counter-clockwise to its home or neutral position near the end of the first cycle of an overdraft operation. At the beginning of the second cycle of an overdraft operation the highest surface 297 of the cam 259 forces the arm 257 counter-clockwise beyond its neutral position, causing the arm 263 through the link 264 to rock the lever 144 counter-clockwise as viewed in Fig. 30 and clockwise as viewed in Fig. 15. This rocks the toggle lever 115 (Fig. 15) clockwise to condition the No. 1 totalizer for a subtract operation in the second cycle of an overdraft operation. During this subtract operation the complement of the true overdraft on the hereinafter described auxiliary differential is subtracted from the cleared No. 1 totalizer leaving the latter with the amount of the true overdraft therein.

Near the end of the second cycle the cam 259, in the manner previously described, allows the arm 257 and connected parts to be positioned by the spring 296 for another total taking operation so that during the third cycle the true amount of the overdraft is cleared from the No. 1 totalizer. Near the end of the third cycle of operation a raised portion 260 of the cam 259 restores the arm 257 and connected parts to their home or neutral positions, and the simultaneous restoration of the overdraft key 80 in a manner to be later described, releases the detent 258, which then re-engages the ear 258 to retain the arm 257 and parts connected thereto in their home positions, while the cam 259 travels on to its home position, as shown in Fig. 30.

Auxiliary differential

In previous Ellis machines, in order to print the amount of an overdraft positively it was necessary for the operator to transfer the complement of the overdraft from the add-subtract totalizer to one of the straight adding totalizers which had previously been cleared. This necessitated the tying up of a totalizer that possibly could have been used to advantage for other purposes. To overcome this condition an auxiliary differential was devised for the present machine into which the complement of an overdraft is temporarily stored during part of an overdraft operation.

A detailed description will now be given of the auxiliary differential mechanism.

A frame 300 (Figs. 2, 7, 18 and 36) is formed by an angle bar 301, having thereon a pair of arms 302 and 303 bent at right angles thereto. The frame 300 is pivoted on a rod 304 which extends through the machine and is rigidly supported in the main frames 53 and 54. Attached to the angle bar 301 is a plurality of brackets 305 having pivoted thereon a series of wheels 306, each having a wide tooth 307 (see also Fig. 21) adapted to cooperate with a projection 308 bent on said brackets 305. The extreme righthand wheel 306 (Fig. 19) is pivoted on the arm 303 having a projection 309 which is in the path of the wide tooth 307. Normally the wide teeth of the wheels 306 rest against the projections 308 and 309 in which positions they are held by an alining bar 310 held in cooperative relation with said wheels by a pair of springs 311, (only one here shown in Fig. 19). The alining bar 310 is pivoted within the frame 300 by means of a pair of arms 312 and 313 formed thereon.

Keyed to the hub 217 (Figs. 20 and 27) is an engaging cam 314, the periphery of which is adapted to co-act with a roller 315 (Fig. 20) carried by an arm 316 secured to the shaft 220. Also secured to the shaft 220 is a pair of arms 318 (Fig. 36), each having therein a cam slot 319 adapted to cooperate with studs 320 fast in the arms 302 and 303 of the frame 300. A pair of springs 321 (only one shown) are tensioned to hold the roller 315 in constant contact with the cam 314. Fast in the arms 312 and 313 are studs 373 and 374 which extend through concentric slots in the arms 302 and 303 of the frame 300 and are adapted to be engaged by the cam arms 318.

As previously explained, in the first cycle of an overdraft operation a total (complement of the overdraft) is taken from the No. 1 totalizer at the beginning of which operation the totalizer wheels are meshed with the actuator racks 71. The initial movement rearward of the actuator racks revolve said wheels 152 until stopped by one of two long teeth 151 thereon coming in contact with its trip pawl 149. This positions the actuators 71 and printing segments 74 commensurate with the amount standing on the totalizer wheels, which in the case of an overdraft is the complement thereof. While the actuators are thus positioned, the cam 314 (Figs. 20 and 21) rocks the arm 316, shaft 220 and arms 318 counter-clockwise. The cam slots 319 co-acting with the studs 320 rock the frame 300 counter-clockwise to mesh the wheels 306 with a series of rack bars 322 (Fig. 2) one of which is carried by each actuator rack 71. The arms 318 in their initial movement counter-clockwise engage the studs 373 and 374 to rock the aliner 310 out of mesh with the wheels 306 after said wheels have been meshed with the rack bars 322. During the last half of the first cycle of an overdraft operation the actuators are returned to their forward positions, rotating the wheels 306 counter-clockwise to positions corresponding to those of the actuators 71.

In the second cycle of an overdraft operation the complement of the overdraft which has been temporarily stored in the auxiliary differential is subtracted from the No. 1 totalizer, which was reset to zero in the preceding total taking operation. This is accomplished in the following manner:

In subtract operations the totalizer wheels 152 (Fig. 2) are meshed with the actuator racks 71 prior to the initial movement of said racks, the same as in total taking operations. The actuator racks in their initial movement rearward rotate the totalizer wheels and the wheels 306 of the auxiliary differential until the wide teeth 307 on said wheels contact the projections 308 and 309. Thus the actuators are returned to the positions they were placed in by the total taking operation in the first cycle, causing the complement of the overdraft to be subtracted from the previously cleared No. 1 totalizer, which leaves the positive amount of the overdraft therein.

Before the actuators 71 start their movement forward in the last half of the second cycle of an overdraft operation, the wheels 306 of the auxiliary differential are disengaged from the racks 322 by the cam 314 and springs 321 returning the arms 318 to normal positions. This also releases the aliner 310, which is re-engaged with the wheels 306 by the springs 311. The auxiliary differential remains in this position throughout the remainder of an overdraft operation.

It will be seen from the foregoing description that when a total is taken of the No. 1 totalizer in the third cycle of an overdraft operation the amount of the overdraft will be printed in positive form, which is the desired result.

It might be well to state at this point that the No. 2 accumulator, if desirable, may be used as a proof for the balance which is automatically printed from the No. 1 totalizer, as above described.

As has been previously stated, the No. 2 hanging bar lever may have associated with it a stop, so that the No. 2 accumulator will be engaged with the actuating racks for adding purposes upon each cycle of the machine. Therefore, during an overdraft operation, which, as above stated, consists of three cycles, the No. 2 totalizer will be engaged three times.

For example, let us assume that the balance printed from the No. 1 accumulator was $76.48; this amount also stands in the No. 2 accumulator. Assume now that the No. 1 accumulator has had several checks subtracted therefrom, so that it shows an overdraft of $3.34. During the three cycles of the overdraft operation the No. 2 accumulator will be engaged during each cycle. During the first cycle thereof the complement of the overdraft, which is 996.66, is added to the No. 2 accumulator during the first cycle of the overdraft operation. During the second cycle of the overdraft operation, the same amount is also added into the No. 2 accumulator. And during the third cycle of the overdraft the positive amount of the overdraft, namely $3.34, is also added into the No. 2 accumulator. The amount now standing in the No. 2 accumulator is $73.14, which is the difference between the last balance of $76.48 and the overdraft of $3.34. This amount of course, can be ascertained by clearing the No. 2 totalizer.

Ribbon shifting mechanism

It is essential that an overdraft be printed in a distinctive color so that it will stand out from other printing upon the same statement or record sheet. To accomplish this, mechanism has been designed for shifting the ink ribbon, which is effective only during an overdraft operation. Such mechanism will now be explained.

Referring to Figs. 8 and 9, fast in the cam plate 62 is a stud 323 adapted to cooperate with a projection 324 on a leg of a pitman 325 having a slot 326 which embraces a stud 327 fast in the arm 244. The right end of the pitman 325 is pivoted to an arm 328 secured to a ribbon shifting shaft 329 rotatably mounted in a top frame 330 (Fig. 3). Secured to the shaft 329 (Fig. 9) by means of a set screw is a settable hub 331 having secured thereto a spring 332 whose upper end is attached to a link 333 pivoted to a shifting lever 334 which in turn is pivoted to a rocker 335. The rocker 335 is pivoted to the top frame 330 at 339 and is operatively connected to a ribbon shifting fork 336 by means of a stud 337 fast on said rocker and extending through horizontal slots cut in a pair of ears 340, only one shown, bent on the fork 336. The fork 336 is mounted to slide vertically in a printer comb plate (not shown). The upper ends of the fork 336 are bent in such a manner as to form a guide 341 for a multi-colored inking ribbon 342, the upper half of which contains black ink, the lower half red. The lever 334 has notches 343 and 344 adapted to cooperate respectively with studs 345 and 346 secured in an arm of a yoke 347 pivoted to the top frame 330. Another arm 348 of the yoke 347 is operatively connected by a link 349 to a stud 338 in an arm 350 (Fig. 22) fast on the printer shaft 245 (Fig. 8) so that each time the printer shaft 245 receives movement the yoke 347 is rocked thereby, its first movement being clockwise.

The mechanism last explained constitutes what is called the ribbon vibrating mechanism and upon each operation of the machine lifts the ribbon into the path of the printing type, the ribbon normally being below the printing line so that the printing will be visible. Normally the notch 343 (Fig. 9) in the arm 334 engages the stud 345 in the yoke 347 so that upon operation of the machine the arm 350 rocks the yoke 347 to raise the fork 336 to a position where the black portion of the ink ribbon will be in line with the printing type.

As previously explained, the roll 60 (Fig. 8) on the arm 51 oscillates the aliner cam plate 62 each time the machine is operated. Likewise under normal conditions the arm 244 is oscillated each time the machine operates and receives its clockwise movement prior to the movement of the plate 62. This causes the pitman 325 to be moved downward to a position where the stud 323 will clear the projection 324, thus imparting no movement to said pitman 325.

As explained above, the printer shaft 245 (Fig. 8) is disabled for the first two cycles of an overdraft operation. This allows the projection 324 to remain in the path of the stud 323 carried by the plate 62 whose clockwise movement rocks the arm 328, shaft 329 and spring 332 clockwise to shift the lever 334, causing the notch 344 to engage the stud 346. This increases the leverage of the yoke 347 on the lever 334. Therefore, when the printer shaft 245 is rocked clockwise during the third cycle of the overdraft operation, and the arm 350 receives such movement, the link 349 rocks the yoke 347 and lowers the lever 334 a greater distance than usual which results in the lifting of the fork 336 to a position where the lower half or red portion of the ribbon is in the path of the type, thus causing an overdraft to be printed in a distinctive color.

Ribbon restoring mechanism

The shaft 329 is returned to normal position in the third cycle and near the end of an overdraft operation in the following manner: Secured to the shaft 329 (Figs. 3 and 22) is an arm 352 bifurcated to embrace a stud 353 fast in a pitman 354 slidably mounted in the machine top frame 330. A latch 355 has a slot and is slidably and pivotally connected to the pitman 354 by a stud 356 passing through said slot and secured in said pitman 354. An ear 357 fast on the latch 355 is normally held against the bottom of a notch in the pitman 354 by a spring 358. Pivoted on a stud 359 fast in the printer side plate (not shown) is a lever 360 having a nose 361 adapted to cooperate with the latch 355. The lower end of the lever 360 is bifurcated to embrace the stud 338 in the arm 350.

When the shaft 329 is rocked clockwise during the first cycle of an overdraft operation in the manner explained above, the pitman 354 is moved to the right (Fig. 22) and the latch 355 assumes the dot and dash line position.

As previously explained, on the last or third cycle of an overdraft operation the printer shaft 245 (Fig. 23) is operatively connected to the arm 51, whereupon the arm 350 (Fig. 22) moves clockwise and rocks the lever 360 clockwise causing the nose 361 to wipe past the latch 355 while the latter is in its moved position, and force said latch upward against the tension of the spring 358. Upon the return or counter-clockwise movement of the arm 350 and lever 360 the nose 361 contacts the latch 355, restores the same and the pitman 354 to their normal positions which rocks the shaft 329 counter-clockwise, thus restoring the ribbon vibrating mechanism to normal position, in which position the black portion of the ribbon will be contacted by the printing type.

*Overdraft key releasing and locking mechanism*

The overdraft key is automatically released near the end of the third cycle of an overdraft operation by means of a release cam 363 (Figs. 23 and 27) keyed to the hub 217. The release cam 363 like the other cams on this line makes one complete revolution for each overdraft operation. The cam 363 near the end of its movement engages a roller 364 carried by the arm 200 and rocks said arm counter-clockwise which through the link 199 (see also Fig. 36) rocks the detent 198 counter-clockwise, releasing the overdraft key, which is returned to normal position by its spring 239.

The overdraft key releasing mechanism also restores the overdraft shaft 164 to normal position, releases the total key 85 for the add-subtract totalizer and causes the overdraft key 93 to be locked in its home position. A hook 366 on the detent 198 is arranged to engage a latch 367 pivoted on the locking plate 194. A spring 370 is tensioned to hold the latch 367 in contact with the bottom of the hook 366.

When the detent 198 is rocked counter-clockwise to release the depressed overdraft key 93, the hook 366 engages the latch 367 and under tension of the spring 201 rocks the locking plate 194 clockwise, causing the step 196 to move under the ear 197 and lock the overdraft key in home position. The clockwise rocking of the plate 194 through the link 199 and arm 191 (Fig. 3) rocks the overdraft shaft 164 counter-clockwise, as viewed in Fig. 3, and clockwise, as viewed in Fig. 33, which through the arm 166, (Fig. 33) link 109 and pitman 107 rocks the No. 1 total key 28.

The latch 367 remains coupled to the hook 366 at the end of an overdraft operation, but upon the subsequent operation of the machine a foot 369 of the latch 367 is engaged by a projection 330 on the arm 51, as the latter is rocked counter-clockwise, and released from the hook 366. The latch 367 then assumes the position shown in Fig. 23.

*Manual tabulating mechanism*

The mechanism for manually tabulating the carriage is old and well known in the art, and is shown herein in Figs. 3, 24, 37 and 38, in order to illustrate how this mechanism is controlled by the overdraft key.

The tabulating section of the machine is carried by a plate 500 (Fig. 37). The manually operated tabulating mechanism is operated by a key 377 (Figs. 3, 24, 37 and 38). Operation of the key 377 raises a stop 501 into the path of a tabulating stop 502, adjustably mounted on the stop bar 96 in the usual and well known manner. The stop 501 is raised by a spring 503 when an arm 504 pivoted at 505 is rotated counter-clockwise. The arm 504 is actuated by an arm 506 pivoted at 507. Arms 504 and 506 are limited in their movements in one direction by a block 507 on plate 500. A spring 508 normally maintains arms 504 and 506 respectively, in the position shown. The left end of arm 506 (Fig. 37) rests above the free end of key 377 (see also Fig. 38), and when the key 377 is depressed the stop 501 is raised by the connection just described.

*Manual tabulating disabling mechanism*

Means for disabling the manual tabulating mechanism during an overdraft operation will now be explained.

Secured in the overdraft key 93 (Figs. 3 and 24) is a stud 375 adapted to cooperate with an extension 376 on a tabulating lever 377 pivoted at 378 to the right machine frame 54. Depression of the overdraft key 93 causes the stud 375 to move just above the extension 376, thereby blocking the movement of the lever 377 during an overdraft operation; thus, preventing manual tabulation of the traveling carriage at this time.

*Machine release during overdraft operation*

In overdraft operations the depression of the overdraft key 93 releases the machine for operation. The mechanism for accomplishing this result will now be explained.

Pivoted at 379 (Fig. 26) to the overdraft key 93 is a link 380 having a slot 381 which embraces a stud 382 fast in an arm 383 of a lever 384 pivoted on the stud 211. Another arm 385 of the lever 384 carries a stud 386 adapted to co-operate with a notch 387 in a clutch release arm 388 pivoted to the motor frame (not shown).

Depression of the overdraft key 93 through the link 380 rocks the lever 384 clockwise, forcing the stud 386 out of the notch 387 in the arm 388. The arm 388 upon being thus released is rocked counter-clockwise by means of a spring (not shown) to release the machine for operation. Near the end of each machine operation the arm 388 is restored by being forced clockwise by mechanism not shown. The lever 384 being under spring tension causes the stud 386 to re-engage the notch 387 to retain the lever 388 in its restored position. In other than overdraft operations, when the machine is released by means of the starting bar 82, the stud 382 moves idly in the slot 381 without disturbing the overdraft key 93.

*Double-acting release bar*

As previously explained, the instant machine is equipped with a double-acting release bar which will be treated in detail in the description to follow.

The release bar 82 (Fig. 3) is pivoted near its center at 379 to the machine keyboard. Pivoted on a stud 389 secured to the right machine frame 54 is a release lever 390 having a stud 391 (Fig. 13) arranged to cooperate with on open-ended slot 392 in an arm 393 of the lever 384. Pivoted to the lever 390 is a tabulating stem 394 (Fig. 3) which extends through an opening in the keyboard and contacts the lower end of the release bar 92. A vertical feed stem 395 (Figs. 3 and 13) has in its lower end a slot which embraces the stud 382 (Fig. 13) carried by the lever 384. The upper end of the stem 395 likewise extends through an opening in the keyboard and contacts the upper end of the release bar 92. The stem 394 has a projection 396 and the stem 395 has a projection 397 which are adapted to contact the lower surface of the keyboard to limit the upward movement of the stems 394 and 395. A spring 398 tensioned to pull the lever 390 in a clockwise direction normally holds the projections 396 and 397 in contact with the lower surface of the keyboard. Fast in the stem 395 is a stud 399 (Fig. 13) arranged to cooperate with a projection 400 on an arm 401 loosely mounted on the stud 211. A spring 402 is tensioned to hold the projection 400 in contact with the stud 399. The upper end of the arm 401 is shouldered to cooperate with a stud 403 carried by a lever 404 pivoted at 405 to the right machine frame 54.

Loosely mounted on the stud 382 is an arm 406 bifurcated to receive the stud 403. An arm 407 of the lever 404 has an extension 408 which cooperates with a stud 409 fast in a key release bar 410 slidably mounted on the right printer plate (not shown). The right end of the bar 410 has a foot 434 arranged to cooperate with a stud 411 in a latch 412 pivoted to an arm 413 secured to one end of a sleeve 414 turnably mounted in the machine top frame. Secured to the other end of the sleeve 414 is a crank 415 which is pivoted to a platen feed arm 416. Secured to the printer shaft 245 is a paper feed operating arm 417 carrying a stud 418 arranged to cooperate with the latch 412.

Referring to Fig. 14, a projection 419 on the arm 407 is arranged to cooperate with an extension 420 of a tabulating disabling lever 421 pivoted to the right machine frame. The left end of the lever 421 is shaped to form a hook 435 arranged to embrace a stud 422 fast in a tabulating release lever 423 pivoted to the right frame 54. A pawl 424 turnably mounted on the printer operating link 242 is adapted to engage the stud 422 for a purpose to be later described. A spring 425 is tensioned to hold an ear 426 bent on the pawl 424 in contact with the edge of the driving link 242.

Depression of the upper end of the release bar 92 (Figs. 3 and 13) pushes the stem 395 downward and rocks the lever 384 clockwise to release the machine for operation. Likewise the stud 399 co-acting with the projection 400 rocks the arm 401 clockwise whereupon the shoulder on said arm passes under the stud 403 and prevents the lever 404 from moving counter-clockwise under tension of a spring 427. This causes the release bar 410 to remain in the position shown in Fig. 13, in which position the latch 412 is in the path of the stud 418. The arm 417 being secured to the printer shaft 245 oscillates in unison therewith and its clockwise movement causes the stud 418 to wipe past the lower end of the latch 412 rocking said latch counter-clockwise against the tension of a spring 428. Upon the return movement counter-clockwise of the arm 417 the stud 418 engages a shoulder 429 on the latch 412 and raises the same, thus rocking the arm 413, crank 415 and arm 416 clockwise until a tail 430 of the latch 412 strikes a bushing 431 secured to the right printer frame whereupon the latch 412 is disengaged from the stud 418 and a spring 432 returns these connected parts to their home positions which is determined by a stop stud 433, adjustably mounted in the machine top frame, contacting the top edge of the crank 415. The counter-clockwise movement of the arm 413 operates the usual platen roll feeding mechanism.

Depression of the lower end of the release bar 92 (Fig. 3) forces the stem 394 downward to rock the levers 390 and 384 (Fig. 13) to release the machine for operation. As there is no obstruction under the stud 403, the lever 404 under tension of the spring 427 moves counter-clockwise and the extension 408 engages the stud 409 and rocks the bar 410 to the left whereupon the formed foot 434 by contacting the stud 411 rocks the latch 412 clockwise to a position where the shoulder 429 will be out of the path of the stud 418. Thus the vertical feeding mechanism is automatically disengaged.

Normally the pawl 424 (Fig. 14) rides idly over the surface of the hook 435 of the lever 421. However, the rocking of the lever 404 counter-clockwise caused by depression of the lower end of the release bar 92 causes the projection 419 to engage the extension 420 and rock the hook 435 out of the path of the pawl 424. Now as the link 242 moves upward the pawl 424 latches over the stud 422 and as the link 242 moves downward the pawl 424 rocks the tabulating lever 423 thereby automatically releasing the traveling carriage for tabulation from column to column.

The automatic tabulating lever 423, when actuated by hook 424, by a connection about to be described, raises a pair of plungers 509 and 510 (Fig. 37) into the path of stop 95.

Pivoted to frame 500, on stud 511, are two levers 512 and 513. A spring 514 draws up the right end of lever 513 until limited by stop 507 when the parts are in normal condition. The left end of the lever 513 is thus held against one end of a lever 515, pivoted at 516. The left end of the lever 515 projects into the open end (Fig. 38) of arm 423. The spring 514 holds levers 513 and 515, and arm 423 in their normal position shown.

The stop 95 on the carriage is adapted to engage plunger 509 and then plunger 510, the latter being provided to prevent "chattering" of the carriage or rebounding, as fully described in Letters Patent No. 1,731,701, issued to Frederick W. Bernau.

The plunger 509, which constitutes the main stop for the carriage, has a pin and slot connection 517 at its lower end with lever 513, whereby when arm 423 is operated, lever 515 raises the left end of lever 513, which results in elevating plunger 509, against the action of spring 514. The plunger 509 is latched in its raised position by latch 518 pivoted to frame 500 at 519, and having its hooked end pressed against a stud 521 on lever 513 by a spring 520 connected to the frame 500 and to the latch. When lever 513 is raised to raise plunger 509, the latch moves under stud 521 to hold 513 and the plunger 509 in raised position.

The latch 518 is provided with an extension 522 bearing against one side of the plunger 509. When the carriage is released, in the well known manner, it jumps until the stop 95 strikes the plunger 509. The blow delivered by the stop 95 to the plunger 509 causes the latch to become disengaged from the stud 521, thereby allowing lever 513 and plunger 509 to be lowered by spring 514.

A spring 523 provides a flexible means to permit the plungers 509 and 510 to be cammed downwardly to permit the carriage to move past the plungers when moving from right to left, Fig. 37.

As previously described in overdraft operations the depression of the overdraft key 93 (Fig. 26) causes the lever 384 to move clockwise and the lever 404 (Fig. 13) to move counter-clockwise. This causes the hook 435 on the lever 421 to be moved out of the path of the pawl 424 the same as when the lower end of the starting bar 92 is depressed, but inasmuch as the printing mechanism is disabled for the first and second cycles of an overdraft operation, the link 242 receives no movement during that time.

As hereinbefore set out, the printing mechanism is effectively coupled or connected to the driving mechanism at the beginning of the third cycle of an overdraft operation. This causes the pawl 424 to engage the pin 422 to automatically tabulate the traveling carriage at the end of an overdraft operation.

Summarizing the foregoing description, it will be seen that in the present machine the depression of the overdraft key causes the complement of an overdraft to be transposed to and printed as a positive number. Heretofore it required three distinct machine operations and the proper manipulation of various keys for each operation in order to positively print an overdraft. Also, in former machines it was necessary to keep one of the totalizers in reserve for use in overdraft operations. This has been overcome in the present machine by the addition of the auxiliary differential, which leaves the remaining totalizers free for other uses and by the use of which the overdraft is automatically and positively printed by one continuous operation of three cycles.

While the forms of mechanisms herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed is:

1. In a machine of the class described, the combination of an operating mechanism; an adding and subtracting totalizer; differential actuators; an auxiliary differential device; a printing means; an overdraft control member locked when the totalizer contains a positive balance and unlocked when the totalizer contains a negative balance; and means controlled by an operation of the control member to selectively and sequentially control the operation of the totalizer, actuating means, printing means and the auxiliary device to automatically effect a clearing of a negative overdraft from the totalizer, the transferring of that negative overdraft through the actuators into the auxiliary differential device, the subtractive transferring of the negative overdraft from the auxiliary differential device through the actuators to the cleared totalizer to produce a positive overdraft therein, and a second clearing of the totalizer to print the positive overdraft.

2. In a machine of the class described, the combination of a manipulative member; means controlled by an operation of the manipulative member for causing the machine to operate through a plurality of cycles in overdraft operations; an overdraft cam line; a reciprocable actuating member therefor; an oscillating driving member for the actuating member; means operated by the manipulative member for effectively connecting the driving member to the actuating member; and means whereby the reciprocating movement of the actuating member causes the cam line to revolve in a given direction.

3. In a calculating machine capable of operations having a variable number of cycles including regular and overdraft cycles, the combination of an overdraft control member; a plurality of cams integrally mounted for controlling the functions of the machine during overdraft operations; a reciprocable actuating member therefor; an oscillating driving member for the actuating member; means controlled by the overdraft control member for operatively connecting the actuating member to the driving member; and means including a plurality of ratchets and pawls whereby the reciprocating movement of the actuating member causes the cams to make one cycle of movement during the plurality of cycles of an overdraft operation.

4. In a calculating machine the combination of an overdraft control member; a plurality of cams for controlling the various functions of the machine in overdraft operations; a reciprocable actuating member therefor; an oscillating driving member for the actuating member; means controlled by the overdraft control member for operatively connecting the driving member to the actuating member; and means including a series of pawls and ratchets for causing the cams to make one complete revolution for each overdraft operation.

5. In a calculating machine capable of operations having a variable number of cycles including regular and overdraft cycles, the combination of an oscillating driving member adapted to receive one oscillation during regular operations of the machine and a plurality of oscillations during an overdraft operation; means adapted to receive one cycle of movement from the driving member during the plurality of oscillations of the driving member in an overdraft operation to control the functions of the machine during such an operation, said means being normally disconnected from said driving member; an overdraft control member; and a device actuated by the control member for connecting said means to said driving member.

6. In a calculating machine capable of operations having a variable number of cycles including one cycle for regular operations and a plurality of cycles for overdraft operations, the combination of an oscillating driving member adapted to receive one oscillation during each regular operation of the machine and a plurality of oscillations during each overdraft operation; a reciprocable member adapted to be driven by the oscillating member but normally disconnected therefrom during all regular operations; a device to control the functions of the machine during overdraft operations; an overdraft control member; means controlled by the latter to connect the reciprocable member to the oscillating member as a preliminary to an overdraft operation, whereby the reciprocable member receives one reciprocation upon each oscillation of the oscillating member; and means carried by said reciprocable member for operating said device through one cycle of movement during the plurality of reciprocations of the reciprocable member.

7. In a calculating machine having an add-subtract totalizer the combination of a depressible overdraft control member; means for locking the control member in ineffective position; means for unlocking the control member when an overdraft occurs; means for retaining the control member in effective position during an overdraft operation; means for releasing the retaining means after completion of an overdraft operation; and means operated by the retaining means for restoring the locking means to effective position.

8. In a machine of the class described, the combination of an add-subtract totalizer; an overdraft control member; means for locking the control member in ineffective position; means for unlocking said control member when an overdraft occurs in the add-subtract totalizer; means operated by depression of the control member for releasing the machine for an overdraft operation; means for retaining the control member depressed; means for releasing the retaining means at the completion of an overdraft operation; and means operated by the retaining means while being released for restoring the locking means to effective position.

9. In a machine of the class described the combination of a traveling carriage; automatic means for tabulating the traveling carriage; manual means for tabulating the traveling carriage; a manipulative member for controlling the machine during overdraft operations; and means whereby the manipulative member causes the manual tabulating means to be disabled and the automatic means to become effective during overdraft operations.

10. In a machine of the class described, the combination of an accumulator having a single wheel for each denomination, said accumulator adapted to accumulate positive and negative amount; an amount storage mechanism; a normally latched manipulative member released by the accumulator when overdrawn; printing means; a main operating shaft; means to selectively control the operation of the accumulator, the storage mechanism, and the printing means to cause an overdraft in said accumulator to be automatically printed in positive form in one continuous operation; and connections controlled by the manipulative member when operated to connect the control means to the main operating shaft.

11. In an accounting machine the combination of an add-subtract totalizer having a single wheel for each denomination; printing means therefor; a non-accumulating storage mechanism; a manually operable overdraft control member operable only when the totalizer contains a negative balance; a main operating means; means to control the operation of the totalizer storage mechanism and printing means to cause an overdraft to be automatically changed from a complementary to a true amount and as such printed in one continuous operation; and connections actuated by the overdraft control member to couple the last means to the main operating means.

12. In a calculating machine the combination of an add-subtract totalizer, printing means therefor; a non-accumulating storage mechanism; a manually operable negative balance control member locked when the totalizer contains a positive balance and unlocked when the totalizer contains a negative balance; a main operating shaft; and cam means coupled to the main operating shaft by the negative balance control member for controlling the operation of the totalizer, the storage mechanism, and the printing means to cause the complement of a negative balance to be automatically transposed to a true negative balance and as such printed in one continuous operation.

13. In a calculating machine the combination of an accumulator; a manipulative member locked when the totalizer contains a positive balance and unlocked when the totalizer contains a negative balance; a main operating means; means, including cams, a series of arms, and a series of levers coacting with the cams in negative balance operations for causing the machine to cycle through a continuous series of operations; and coupling means actuated by the manipulative member to couple the last means to the main operating means for operation thereby.

14. In a calculating machine, the combination of an add-subtract totalizer; a manipulative member locked when the totalizer contains a positive balance and unlocked when the totalizer contains a negative balance; a main operating mechanism; means operable by the manipulative member to release the machine for operation; and means rendered operable by the main operating mechanism under control of the manipulative member to control the operation of the release means to cause the machine to operate through three uninterrupted cycles in negative balance operations and to automatically control the operation of the add-subtract totalizer for, first, a total operation, second, a subtracting operation, and finally another total operation.

15. In a machine of the class described, the combination of an operating means, an add-subtract totalizer, total taking control means, subtraction control means, printing means, an auxiliary storage differential, an overdraft control member locked when the totalizer contains a positive balance and unlocked when the totalizer contains a negative balance, and control means connected to the operating means by manipulation of the overdraft control means, said control means automatically and selectively controlling the operation of the total taking control means, subtraction control means, storage differential and the printing means whereby a complement of an overdraft is automatically transferred from the totalizer to the storage differential and the totalizer is simultaneously cleared, the complement on the storage differential is then entered subtractively on the cleared totalizer to set up therein the true negative total, and thereafter the true negative total is printed under control of the totalizer.

16. In a calculating machine, the combination of an adding and subtracting totalizer, an auxiliary storage mechanism, an overdraft control member locked when the totalizer contains a positive balance and unlocked when a totalizer contains a negative balance, and means rendered effective by the operation of the member for controlling the operation of the totalizer and the storage mechanism whereby the complement of an overdraft is cleared from the totalizer and entered into the storage mechanism, said complement being thereafter subtractively entered into the cleared totalizer to set up therein the positive amount of the overdraft.

17. In a calculating machine, the combination of an adding and subtracting totalizer, a non-accumulating storage mechanism, actuating means, means for engaging the totalizer with the actuating means, an overdraft control member locked when the totalizer contains a positive balance and unlocked when the totalizer contains a negative balance, and means rendered operative by the member for controlling the operation of the totalizer engaging means, the actuating means and the storage mechanism, for clearing the totalizer and transferring the complement of an overdraft from the totalizer into the storage mechanism and for thereafter subtractively entering the complement into the cleared totalizer to obtain a true negative total.

18. In a machine of the class described, the combination of an add-subtract totalizer; printing means; an auxiliary storage means; a manipulative member locked when the totalizer contains a positive balance and unlocked when the totalizer contains a negative balance; a main operating means, means operable by said member for releasing the main operating means for operation, and cycle control means rendered effective by actuation of the manipulative member to control the releasing means to cause the machine to automatically operate through a plurality of cycles and to selectively control the operation of the totalizer, storage means and printing means to print a true negative balance in one continuous operation.

19. In a machine of the class described, the combination of an add-subtract totalizer, actuating mechanism therefor, mechanism for engaging the totalizer with its actuating mechanism, non-accumulating storage devices cooperable with the actuating mechanism, and means operable during a continuous and uninterrupted overdraft operation to automatically and selectively control the operation of the totalizer engaging mechanism, the actuating mechanism and the storage mechanism, whereby the complementary amount of an overdraft is transferred from the totalizer to the storage mechanism and the totalizer cleared, and then the complementary amount in the storage device is entered subtractively into the cleared totalizer to set up therein the true amount of the overdraft.

20. In a machine of the class described, the combination of an add-subtract totalizer, actuating mechanism therefor, and auxiliary storage devices cooperable with the actuating mechanism, means effective during continuous and uninterrupted overdraft operations for automatically controlling the operation of the totalizer, actuating mechanism, and the storage devices whereby the totalizer is cleared and controls the actuating mechanism to position the storage devices according to the complement of the overdraft and the storage devices thereafter control the actuating mechanism to subtract the complement from the cleared totalizer whereby the true amount of the overdraft is set up therein.

21. In a machine of the class described, the combination of an add-subtract totalizer; non-accumulative storage mechanism; printing means; actuating means cooperable with the totalizer, the storage mechanism and the printing means; means normally operable to release the machine for a single cycle of operation; and control means effective during true negative total printing operations to control the release means to cause the actuating means to be operable for three continuous cycles of operation, said control means controlling the operation of the totalizer, the storage mechanism, and the printing means during the three cycles of operation whereby during the first cycle a complementary overdraft is transferred from the totalizer to the storage mechanism and the totalizer is cleared, during the second cycle the complementary amount in the storage mechanism is entered subtractively into the cleared totalizer to set up therein the true negative total, and during the third cycle the printing means is effective to print the true negative total under control of the totalizer.

22. In a machine of the class described having an add-subtract totalizer, non-accumulating storage mechanism, printing means, actuating means and means normally operable to release the machine for a single cycle of operation, the combination of means operable to initiate a true negative total printing operation, means to retain the initiating means in operated position during three continuous cycles of operation, and means operable during the three cycles for controlling the operation of the totalizer, storage mechanism, printing means, machine release means and the retaining means whereby a complement of a negative total is changed to a true negative total and the true negative total is printed.

23. In a calculating machine, normally operable in single cycle operations, an add-subtract totalizer, non-accumulating storage devices, printing means, means to release the machine for a single cycle of operation and a cycle controlling means operable to control the operation of the totalizer, storage devices, printing means and release means during three cycles of operation and according to a predetermined schedule for printing a true negative total.

CHARLES L. LEE.